(12) United States Patent
Negoro

(10) Patent No.: US 8,305,606 B2
(45) Date of Patent: Nov. 6, 2012

(54) JOB MANAGEMENT SYSTEM, APPARATUS, AND METHOD FOR DISTRIBUTING PRINT JOB INFORMATION LIST IN RSS FORMAT

(75) Inventor: Shigeo Negoro, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1103 days.

(21) Appl. No.: 11/901,170

(22) Filed: Sep. 13, 2007

(65) Prior Publication Data

US 2008/0068650 A1    Mar. 20, 2008

(30) Foreign Application Priority Data

Sep. 15, 2006  (JP) ................................ 2006-250593
Jul. 18, 2007  (JP) ................................ 2007-187556

(51) Int. Cl.
*G06F 3/12* (2006.01)
(52) U.S. Cl. ........................................... 358/1.15
(58) Field of Classification Search .................. None
See application file for complete search history.

(56) References Cited

U.S. PATENT DOCUMENTS

| | | | | |
|---|---|---|---|---|
| 2002/0030743 A1* | 3/2002 | Inui | ............... | 348/195 |
| 2005/0180793 A1* | 8/2005 | Nishiguchi | ............... | 400/76 |
| 2006/0033950 A1* | 2/2006 | Nakamura | ............... | 358/1.15 |
| 2006/0082827 A1* | 4/2006 | Lee et al. | ............... | 358/1.15 |
| 2006/0126114 A1* | 6/2006 | Choi et al. | ............... | 358/1.15 |
| 2007/0236725 A1* | 10/2007 | Harmon et al. | ............... | 358/1.15 |
| 2007/0244874 A1* | 10/2007 | Tawde | ............... | 707/4 |

FOREIGN PATENT DOCUMENTS

| | | |
|---|---|---|
| JP | 10-149242 | 6/1998 |
| JP | 11-275300 | 10/1999 |
| JP | 2002-312243 | 10/2002 |
| JP | 2002-334177 | 11/2002 |
| JP | 2003-131930 | 5/2003 |
| JP | 2005-209056 | 8/2005 |
| JP | 2005-284334 | 10/2005 |
| JP | 2006-54732 | 2/2006 |
| JP | 2006-209309 | 8/2006 |

OTHER PUBLICATIONS

Oct. 18, 2011 Japanese official action in connection with a counterpart Japanese patent application.

* cited by examiner

*Primary Examiner* — Fan Zhang
(74) *Attorney, Agent, or Firm* — Cooper & Dunham LLP

(57) ABSTRACT

A job management system includes a print server and an image forming apparatus. The print server publishes, on a network, a print-job information list in an RSS format. The image forming apparatus spontaneously obtains and reads the print-job information list, and, based on the print-job information list, requests the print server to transmit a print job. In response to the request, the print server transmits the print job to the image forming apparatus.

13 Claims, 17 Drawing Sheets

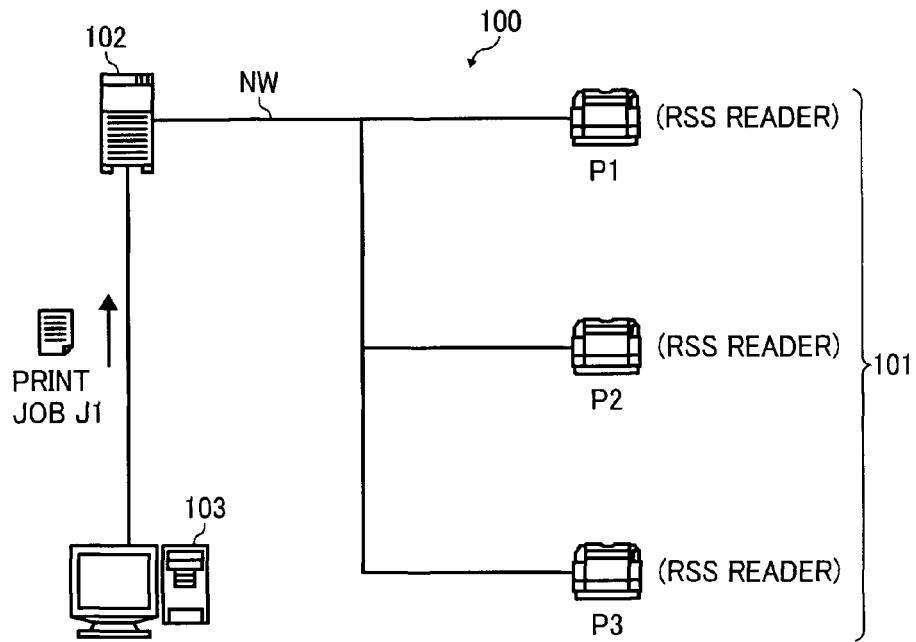
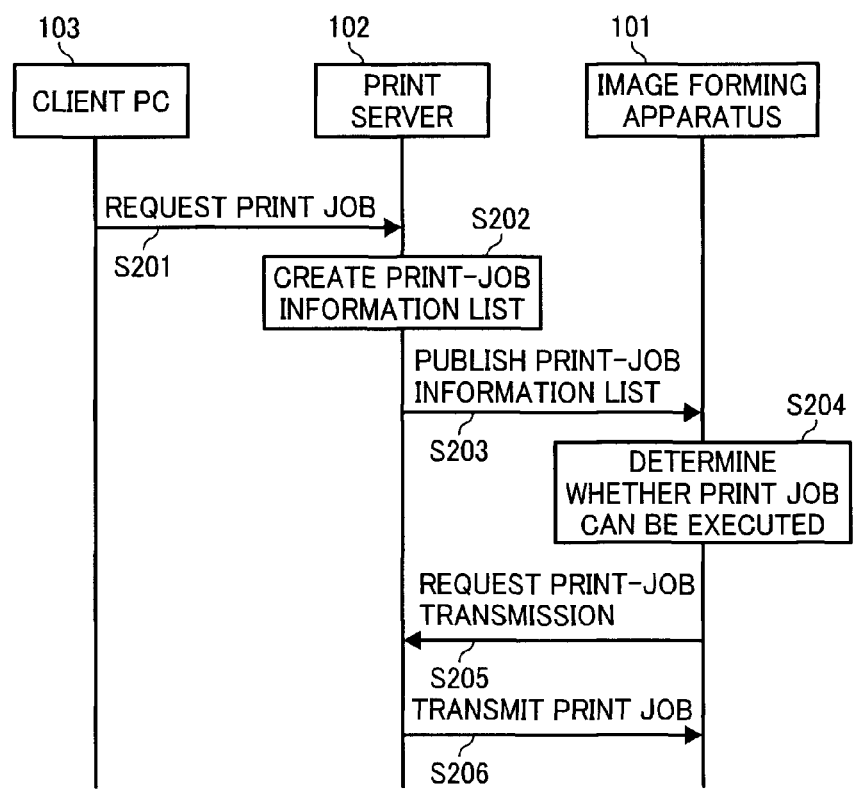

PRINT JOB INFORMATION No.1  — 2000
<<JOB INFORMATION>>
JOB ID: 103
RESERVATION No.: 301
CLIENT IP: 133.139.141.111
USER ID: CA
<<JOB DETAILS>>
    TITLE: DOCUMENT J3
    PAGES: 5
    COPIES: 3
    SIZE: A3
    DUPLEX PRINTING
    COLOR PRINTING
<<PRINT CONDITION>>
    IP ADDRESS: 133.139.177.131 OR
                133.139.177.142 OR
                133.139.177.150
    PPM: 30 OR MORE         — 2001

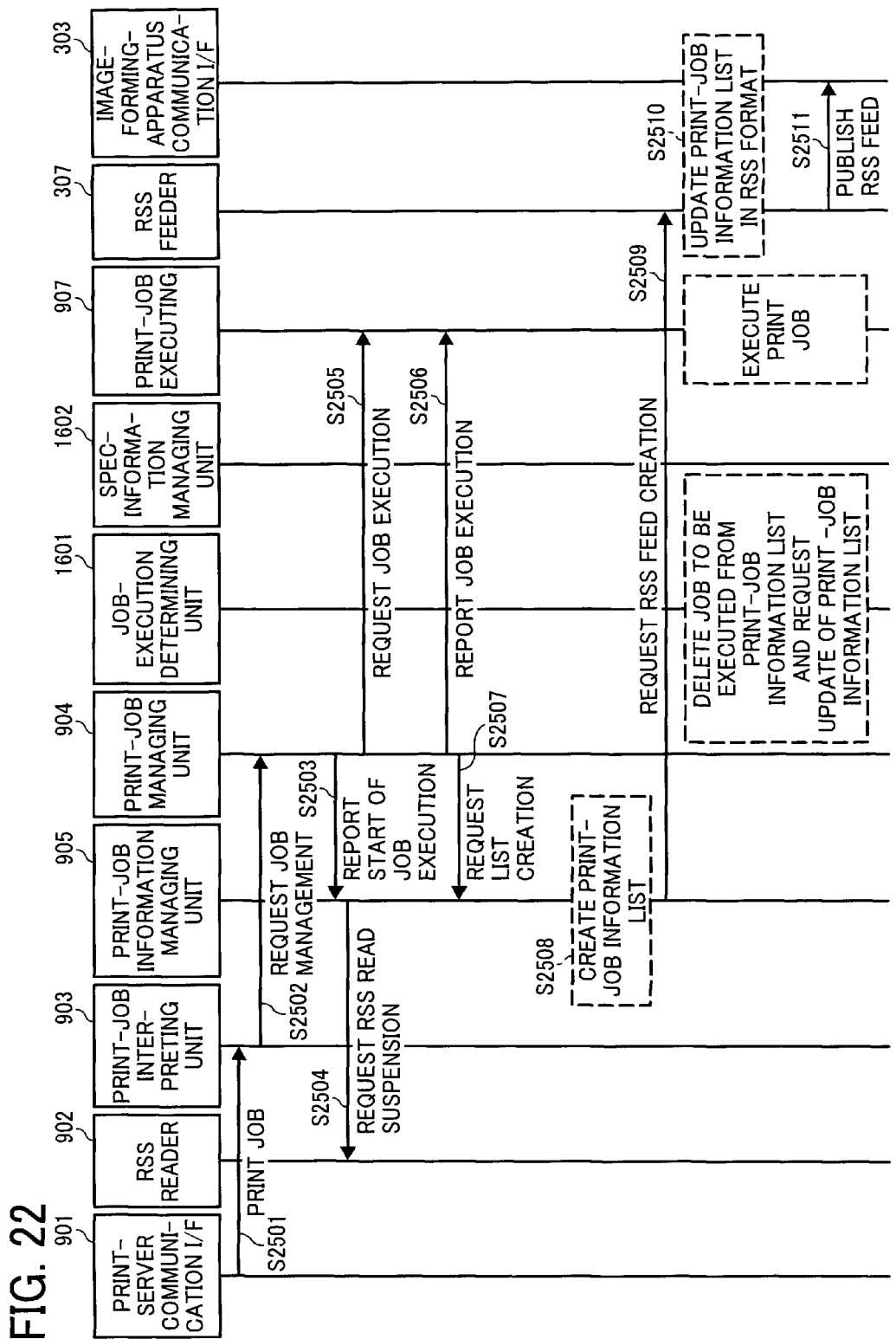

JOB MANAGEMENT SYSTEM, APPARATUS, AND METHOD FOR DISTRIBUTING PRINT JOB INFORMATION LIST IN RSS FORMAT

CROSS-REFERENCE TO RELATED APPLICATIONS

The present application claims priority to and incorporates by reference the entire contents of Japanese priority documents, 2006-250593 filed in Japan on Sep. 15, 2006, and 2007-187556 filed in Japan on Jul. 18, 2007.

BACKGROUND

1. Technical Field

This disclosure relates to a technology for job management.

2. Description of the Related Art

A network print system has been widely used in which a plurality of devices each having a printer function (hereinafter, "printing apparatus") are connected together via a network, such as a large-area network (LAN) and a print output operation of a client device connected to the same network is efficiently performed by using each printing apparatus. Also, with a print server (device), a more efficient network print system can be configured. Various types of such systems have already been proposed.

In a network print system, many printing apparatuses differed in printing scheme and printing performance (including image-printing function) and those further including additional functions are used. For example, in a system configuration of a multifunction product (MFP) or a digital MFP, multifunctionalization has advanced, allowing, in addition to the conventionally-existing printer interface (I/F) and facsimile function, a local storage (LS) function based on a large-capacity memory, such as a hard disk drive (HDD), incorporated as standard and a data transfer function with a host personal computer (PC) via a network, thereby providing many applications for use in a network print system. The MFP of this type is explained below as an example.

As disclosed in Japanese Patent Application Laid-Open Publication No. 10-149242, among various devices having a printer function, in particular, machines such as printers, facsimile machines, and copiers, some have incorporated therein a Web access mechanism, thereby having an enhanced user interface function using Web technology. Since such a user interface function using Web technology is achieved by using a processor, a memory, an input/output circuit, etc. that already exist in the device, there is an advantage of not requiring additional cost and space required for a Web print server function. Therefore, many machines such as printers, facsimile machines, and copiers have a function of providing information stored therein or an external auxiliary device to users as a Web page targeted for a general Web browser.

The Web page is described normally in Hypertext Markup Language (HTML). HTML has described therein not only information itself but also layout information, such as a character size and centering, and its format may vary depending on the device providing the Web page. In companies, for example, there is a strong desire from administrators that many introduced business machines, such as printers, facsimile machines, and copiers, be collectively managed by using dedicated management software. Some devices include a function of providing information stored therein or an external device to the outside by using a technology, such as Simple Network Management Protocol (SNMP) or extensible Markup Language (XML)/Simple Object Access Protocol (SOAP). A technology using SOAP as a way of providing a device management function is also called a Web service, which has been used not only in the business machines but also for various purposes.

Generally, in the Web service, a device provides a service to another device. The unit of service is thus small, and a wide variety of services are provided. Therefore, a Web service provider can develop software causing various processes to be achieved depending on a combination of services for use. On the other hand, Web service interface specifications can be freely defined by a Web service provider, and therefore have incompatible formats depending on the type of the Web service providing device. For this reason, it is not an easy task to develop client software supporting different types of devices or client software using a Web service for different types of devices.

As a way of solving the problems above, specification of formats in XML format called Resource Description Framework (RDF) and RDF Site Summary (RSS) have been developed and widely published to people in general. These are mechanisms for describing information as metadata, allowing information to be easily used among different types of devices.

Japanese Patent Application Laid-Open Publication No. 2003-131930 discloses a conventional technology related to a content conversion processing apparatus that actively selects a style sheet in an XML document and converts content, a style-sheet automatic selecting method, and a computer program associated therewith. Japanese Patent Application Laid-Open No. 2002-312243 discloses a conventional technology related to creation of contents according to an output device.

Japanese Patent Application Laid-Open No. 2006-054732 discloses a conventional technology for allowing, for example, the state of communication history of a plurality of MFPs to be quickly grasped by a computer by using mechanism of RSS field. In this conventional technology, a copier (image forming apparatus) serves as an RSS feeder to distribute apparatus information, such as communication history, to unspecified clients. Japanese Patent Application Laid-Open No. 2005-209056 discloses a conventional technology for allowing inter-availability of information stored in external apparatuses as well as various network apparatuses, such as a printer, a facsimile machine, an MFP, a document-managing print server that can be connected to the network, such as LAN.

In general, in a network print system when a print job is received while a specific device is performing a print process, there is an inconvenience that the received job cannot be promptly executed as expected. To get around this inconvenience, in a conventional technology disclosed in Japanese Patent Application Laid-Open No. H11-275300, even when data to be printed is received while a print process is performed by any function, if an MFP (image forming apparatus) on a network is requested for a print job while performing printing, print data is transmitted to another MFP (image forming apparatus) on the network, thereby promptly printing received data without interrupting the print process currently being processed. In this conventional technology, a print-job transmitting side searches the network for a transmission partner. Therefore, each image forming apparatus has to recognize other printing apparatuses on the network. This poses a considerable load on designing and maintenance of the system.

As explained above, with the conventional technologies, the print server or printing apparatus side has to perform information registration and management of other image forming apparatuses or the like. Therefore, complex control and management are required, putting a load on the system. Also, many settings are necessary for changing the system, requiring efforts.

BRIEF SUMMARY

According to an aspect of this disclosure, a job management apparatus includes a job managing unit that stores therein jobs requested by a client terminal; a job-information managing unit that creates a job-information list including a list of the jobs; a feeder that converts the job-information list to public data in a format defined to transmit the public data to an output device; a first transmitting unit that transmits the public data to the output device; a receiving unit that receives, from the output device, a transmission request for a job in the job-information list; and a second transmitting unit that transmits, in response to the transmission request, the job from the job managing unit to the output device.

According to another aspect of this disclosure, a job management system includes an output device that performs a job, and a job management apparatus that transmits the job to the output device. The job management apparatus includes a job managing unit that stores therein jobs requested by a client terminal; a job-information managing unit that creates a job-information list including a list of the jobs; a feeder that converts the job-information list to public data in a format defined to transmit the public data to the output device; a first transmitting unit that transmits the public data to the output device; a receiving unit that receives, from the output device, a transmission request for a job in the job-information list; and a second transmitting unit that transmits, in response to the transmission request, the job from the job managing unit to the output device. The output device includes a receiving unit that receives the public data from the job management apparatus; a reader that creates the job-information list based on the public data; a specifying unit that specifies a job to perform based on the job-information list; and a third transmitting unit that transmits a transmission request for the job specified by the specifying unit to the job management apparatus.

According to still another aspect of t this disclosure, a job management method applied to a job management system including an output device that performs a job, and a job management apparatus that transmits the job to the output device, includes, in the job management apparatus, storing jobs requested by a client terminal; creating a job-information list including a list of the jobs; converting the job-information list to public data in a format defined to transmit the public data to the output device; transmitting the public data to the output device; receiving, from the output device, a transmission request for a job in the job-information list; and transmitting, in response to the transmission request, the job to the output device, and, in the output device, receiving the public data from the job management apparatus; creating the job-information list based on the public data; specifying a job to perform based on the job-information list; and transmitting a transmission request for the job specified at the specifying to the job management apparatus.

The aforementioned and other aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 1 is a schematic diagram of a network print system according to a first embodiment of the present invention;

FIG. 2 is a sequence diagram of an operation procedure of the network print system;

FIG. 22 is a sequence diagram of an operation procedure of the image forming apparatus shown in FIG. 21.

DETAILED DESCRIPTION OF THE PREFERRED EMBODIMENTS

Figure 3:
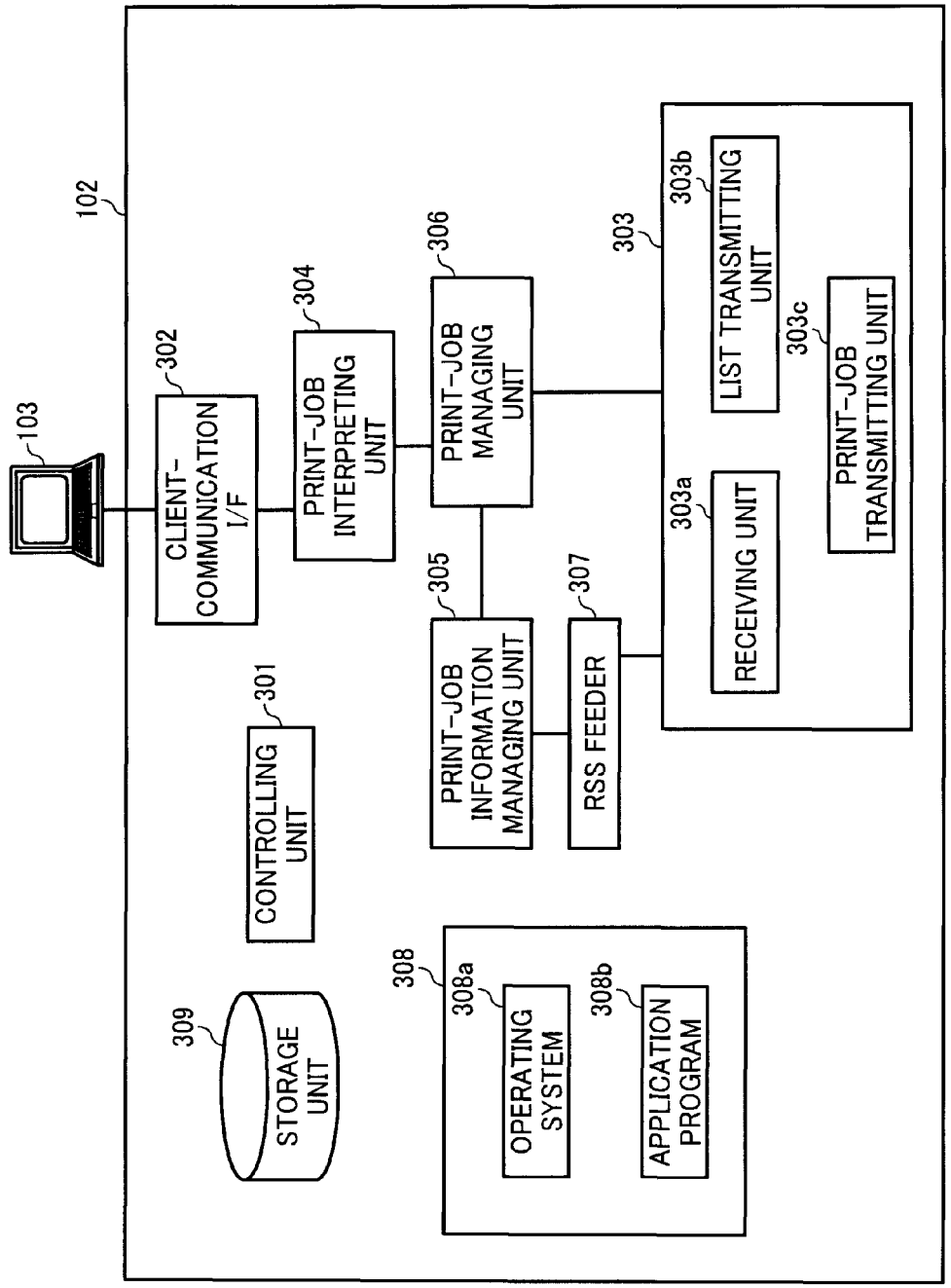
FIG. 3 is a block diagram of a print server shown in FIG. 2.

Exemplary embodiments of the present invention are explained in detail below with reference to the accompanying drawings.

In the following embodiments, a job management apparatus is explained as being applied to a print server. A network system explained below includes the configuration of the job management system. An image forming apparatus outputs a print or a printed recording medium, and therefore, it corresponds to an output device.

FIG. 1 is a schematic diagram of a network print system 100 according to a first embodiment of the present invention. The network print system 100 includes an image forming apparatus 101, a print server 102, a client PC 103, and is located in an office or the like.

The client PC 103 is, for example, a user terminal such as a desktop personal computer with a built-in microcomputer. The client PC 103 and the print server 102 with a built-in microcomputer are connected via a network NW. The print server 102 and the image forming apparatus (P1 to P3) 101 as a printing apparatus are connected to each other via the network NW. In the first embodiment, the image forming apparatus 101 is explained as an MFP.

Although only one client PC (103) is shown in FIG. 2, there may be a plurality of client PCs that are connected to the print server 102. Besides, the image forming apparatus 101 is explained as being used as a printing apparatus; however, for example, the image forming apparatus 101 can be a facsimile machine having a print function or can be connected to any types of MFPs having a print function. That is, the image forming apparatus (or printing apparatus or printer) indicates any of those having a print function.

The network NW (LAN) is a high-speed network, such as Ethernet (registered trademark) or The Institute of Electrical and Electronic Engineers (IEEE) 1394 network, capable of simultaneously transferring a plurality of pieces of data. Ethernet is a Carrier Sense Multiple Access with Collision Detection (CSMA/CD) network standards defined in IEEE 802.3 standards. IEEE 1394 is a communication scheme defined in IEEE 1394.

With the use of any of these communication schemes, the network NW performs communication through data transmission and reception in units of packet based on a predetermined communication protocol (for example, Transmission Control Protocol/Internet Protocol (TCP/IP)). According to the first embodiment, the constituent elements of the network print system 100 are connected together through a wired network. However, for example, the constituent elements of the network print system 100 can be connected together through a wireless LAN, such as IEEE 802.11b.

Although not shown, the image forming apparatus (MFP) 101 is assumed to be connected to a general telephone line or an analog, such as Integrated Services Digital Network (ISDN) or Public Switched Telephone Network (PSTN) that is digital telephone network, for using a facsimile function.

Also, when the network print system 100 includes an external client terminal, the network NW is connected to Wide Area Network (WAN) not shown through a predetermined gateway device (GW). Then, the external client terminal is connected to the network NW via the WAN and the gateway device. The WAN is assumed to a communication network, such as the Internet, based on the predetermined communication protocol, such as TCP/IP.

An operation procedure of the network print system 100 for executing a print job requested by the client PC 103 is briefly explained referring to FIG. 2.

First, the client PC 103 transmits, to the print server 102, data to be printed to request a print job (step S201). Upon receipt of the request for the print job from the client PC 103, the print server 102 creates print-job information list including a list of received print jobs (step S202). The print server 102 then converts the print-job information list to a print-job information list in RSS format, and then publishes the list to the image forming apparatus 101 connected through the network NW (step S203).

The print-job information list in RSS format is published data obtained by converting the print-job information list to RSS format for the purpose of transmission to the image forming apparatuses 101 on the network.

The term "publish" as used herein refers to a process of storing the print-job information list in RSS format for transmission to another apparatus and transmitting the list when a transmission request from the image forming apparatus 101 is received.

Upon receipt of the print-job information list in RSS format from the print server 102, the image forming apparatus 101 converts the print-job information list in the RSS format to create a print-job information list and specify an executable job from the print job included in the print-job information list (step S204). Upon specifying an executable print job, the image forming apparatus 101 transmits a transmission request for the print job to the print server 102 (step S205).

Upon receipt of the transmission request for the print job from the image forming apparatus 101, the print server 102 transmits the print job to the image forming apparatus 101 (step S206).

Constituent elements of the network print system 100 is specifically explained below.

The client PC 103 requests a print job to the print server 102 connected through the network NW. In the first embodiment, a print job is assumed to include print data. A known PC can be used as the client PC 103. For example, the client PC 103 can be a personal computer (PC), and is placed in an office. The client PC 103 is assumed to include a predetermined Network Information Center (NIC), thereby being connectable to the network NW. With this, the client PC 103 is mutually connected to the image forming apparatus 101 and the print server 102 via the network NW.

As explained below, the client PC 103 requests execution of a print job to the print server 102 as appropriate. Specifically, the client PC 103 transmits predetermined print data via the network NW. The client PC 103 stores therein only information about the print server 102 (for example, an Internet Protocol (IP) address and a scheme of requesting a print job). Thus, the information about each image forming apparatus to execute a print job is assumed to be not stored.

FIG. 3 is a block diagram of the print server 102. The print server 102 has a generally-known configuration as an print server, and includes a controlling unit 301, a client-communication I/F (communication controlling unit) 302, an image-forming-apparatus communication I/F 303 that relates to the communication with another image forming apparatus (printing apparatus) on the network, a program storage unit 308, and a storage unit 309, and also includes a print-job interpreting unit 304, a print-job information managing unit 305, a print-job managing unit 306, and an RSS feeder 307.

The controlling unit 301 includes, for example, a Central Processing Unit (CPU) and a storage unit such as Random Access Memory (RAM) as a work area to control each component of the print server 102 and perform each process or the like based on operation programs stored in the program storage unit 308.

The program storage unit 308 can be a hard disk drive or a Read Only Memory (ROM), and stores therein various operation programs to be executed by the controlling unit 301, such as an operating system (OS) 308*a* and an application program 308*b*.

The client-communication I/F (communication controlling unit) 302 includes, for example, a predetermined communication device, such as a predetermined NIC, to communicate with the client PC 103. In the first embodiment, the client-communication I/F 302 receives a print job requested by the client PC 103.

The print-job interpreting unit 304 interprets information in the print job, and converts it to data to be handled in the print server 102.

The print-job information managing unit 305 manages and updates the print-job information list. The print-job information managing unit 305 forms a job-information managing unit to manage and update the print-job information list. The print-job information managing unit 305 creates a print-job information list including a list of print jobs stored in the print-job managing unit 306.

The print-job information managing unit 305 receives information associated with each print job (hereinafter, "print-job information") from the print-job managing unit 306, and creates a list of print-job information of the respective print jobs as a print-job information list. Details of the print-job information and the print-job information list are explained below.

Also, the print-job information managing unit 305 receives from the print-job managing unit 306 a report of addition or deletion of a print job every time a print job stored in the print-job managing unit 306 is added or deleted. The print-job information managing unit 305 assumes to create a new print-job information list based on the report of addition or deletion of the print job.

The print-job managing unit 306 forms a job managing unit, has a memory therein, and stores and manages a plurality of print jobs requested by the client PC 103. Every time a print job is read by the print-job interpreting unit 304, the print-job managing unit 306 stores the print job.

Upon addition or deletion of a print job, the print-job managing unit 306 reports to the print-job information managing unit 305 the addition or deletion of the print job. Together with the report of the addition or deletion of the print job, print-job information of the print job is transmitted to the print-job information managing unit 305.

When receiving a transmission request for the print job from the image forming apparatus 101 through the image-forming-apparatus communication I/F 303, the print-job managing unit 306 searches the stored print jobs based on a job identification (ID) and a reservation number contained in the transmission request. Then, the print-job managing unit 306 transmits the print job requested in the transmission request to the image-forming-apparatus communication I/F 303.

The RSS feeder 307 converts the print-job information list to a print-job information list in RSS format for publication on the network NW via the image-forming-apparatus communication I/F 303. The print-job information list is converted to a print-job information list in RSS format, but this is not meant to be restrictive. For example, the list can be converted to any data in any other format defined for the purpose of transmission to the image forming apparatus 101 connected via the network NW, such as, for example, Atom or News ML.

The image-forming-apparatus communication I/F (communication controlling unit) 303 includes, for example, a predetermined communication device, such as a predetermined NIC, to communicate with the image forming apparatuses 101.

The image-forming-apparatus communication I/F (communication controlling unit) 303 includes a receiving unit 303a, a list transmitting unit 303b, and a print-job transmitting unit 303c.

In response to a request for publication from the RSS feeder 307, the list transmitting unit 303b stores a print-job information list in RSS format in a buffer (not shown), and then transmits the print-job information list to the image forming apparatus 101 when receiving a transmission request from the image forming apparatus 101 on the network NW.

The receiving unit 303a receives a transmission request for requesting transmission of a print job included in the print-job information list from any one of the image forming apparatuses 101 connected via the network NW.

The print-job transmitting unit 303c transmits the print job requested in the transmission request from the print-job managing unit 306 to the image forming apparatus 101. Upon receipt of the transmission request for requesting transmission of a print job from the image forming apparatus 101, the print-job transmitting unit 303c transmits the print job requested in the transmission request from the print-job managing unit 306 to the image forming apparatus 101. The print job is transmitted based on IP address information included in the transmission request.

Such independent network interfaces are identified as separate nodes on the network. In the communication controlling unit, at the time of communication with the image forming apparatus 101 and the client PC 103 via the network NW, predetermined encryption, such as Secure Socket Layer (SSL) is assumed to be performed.

Figure 4:
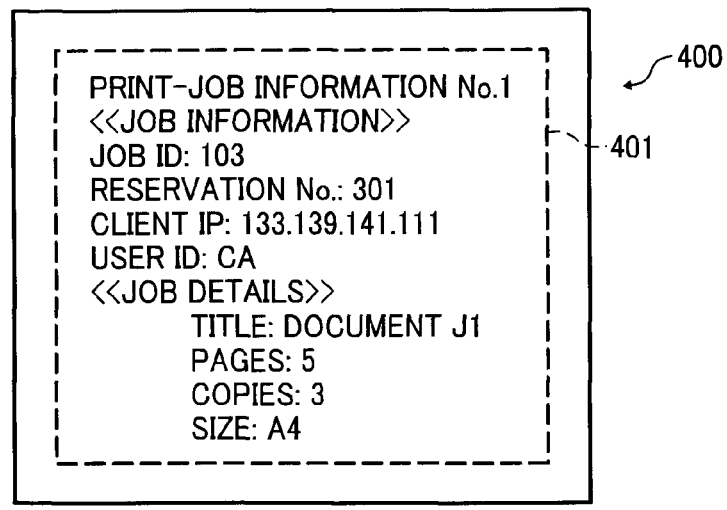
FIG. 4 is one example of a print-job information list in an RSS feed format.

As explained above, the print server 102 interprets the information about the print job requested by the client PC 103 to create a print-job information list 400 in RSS format, as exemplarily shown in FIG. 4 in RSS feed format. The print-job information list 400 in RSS format is published on the network NW as an RSS feed (see FIG. 5).

FIG. 4 is one example of the print-job information list 400 in RSS format. The print-job information list 400 in RSS format includes a list of print-job information 401 of each print job. The print-job information 401 includes job information for identifying the each print job (for example, job ID, reservation number, IP address of the client PC, and user ID) and job details including details of print data included in the print job (for example, tile of the print data, the number of pages of a document, the number of copies, and size).

Figure 5:
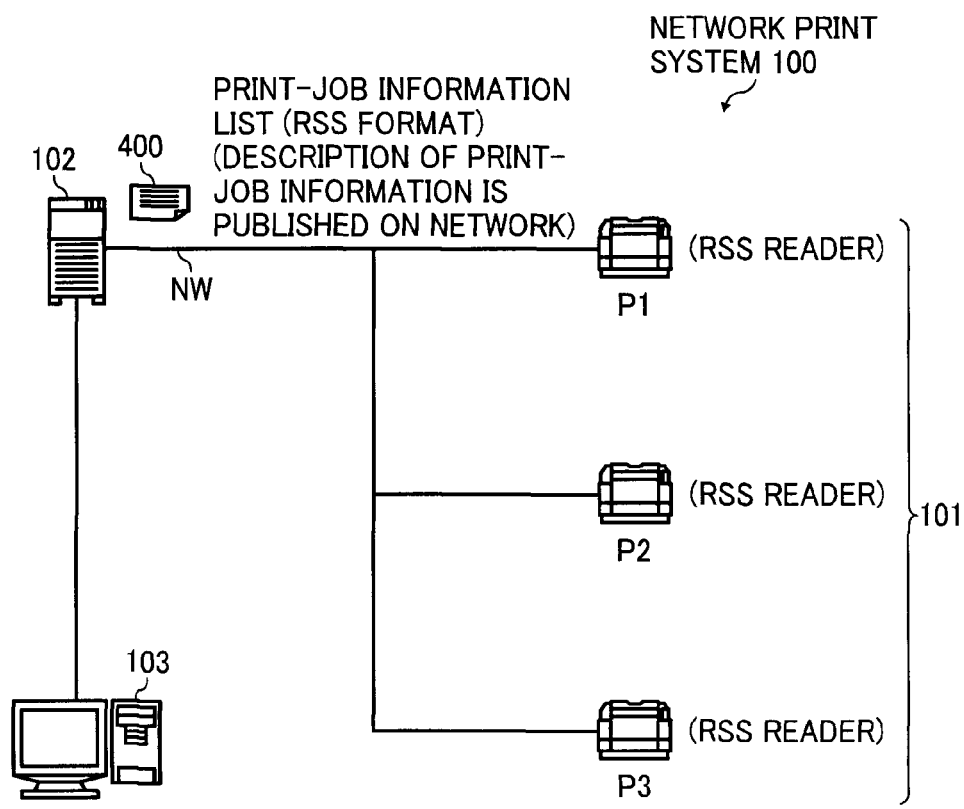
FIG. 5 is a conceptual diagram for explaining part of a process performed by the print server for publishing the print-job information list.

FIG. 5 is a schematic diagram for explaining the process of publishing the print-job information list 400 in the network print system 100. As shown in FIG. 5, the print-job information list 400 is published from the print server 102 to the image forming apparatus 101 connected via the network NW. With this, the image forming apparatus 101 can recognize the print job stored in the print server 102.

Figure 6:
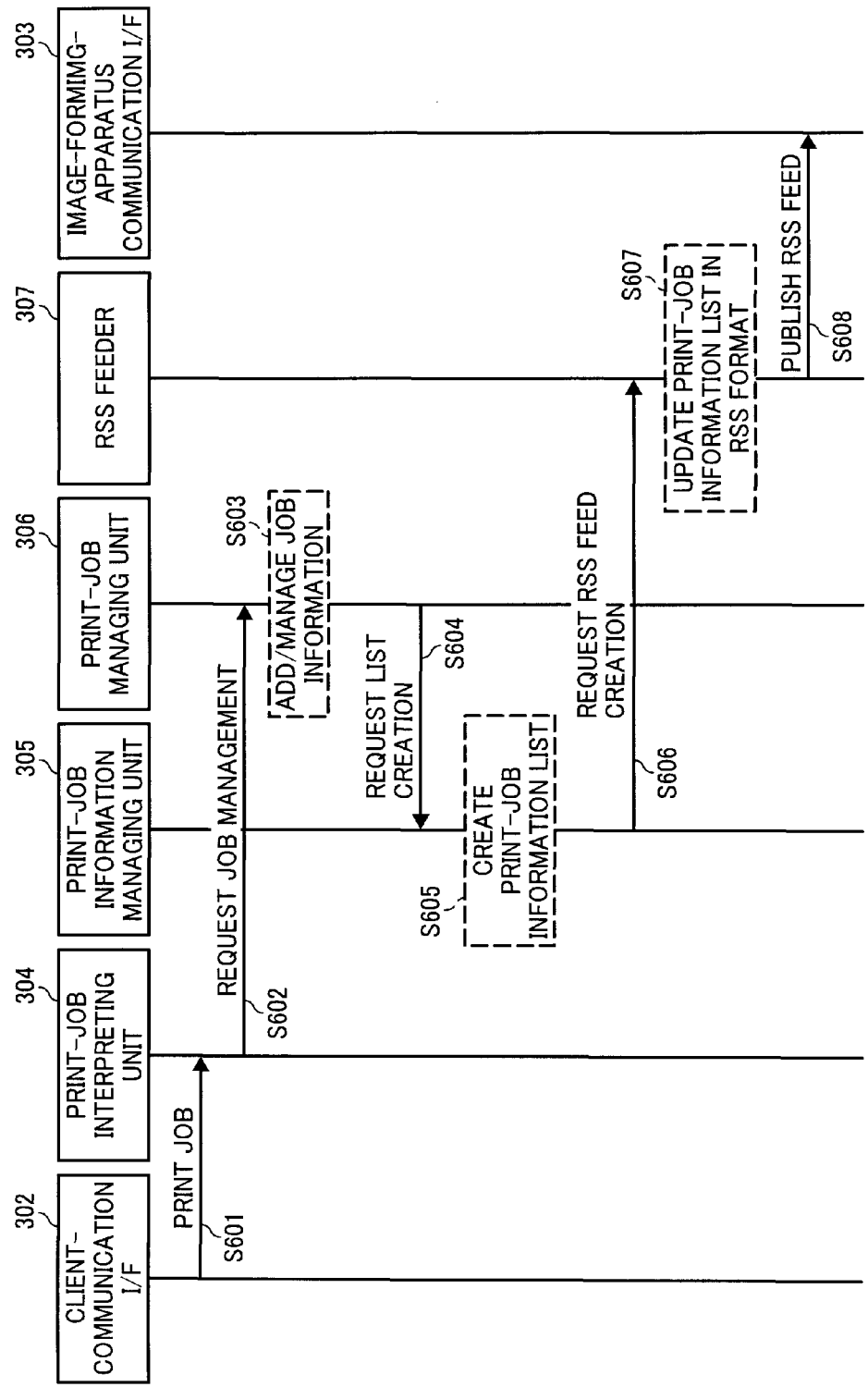
FIG. 6 is a sequence diagram for explaining part of a process performed by the print server.

FIG. 6 is a sequence diagram of the process of publishing the print-job information list 400 performed by the print server 102. First, the print job requested by the client PC 103 is read by the print-job interpreting unit 304 via the client-communication I/F 302, and is then converted to data to be handled in the print server 102 (step S601). The print-job interpreting unit 304 then requests the management of the read print job to the print-job managing unit 306 (step S602).

The print-job managing unit 306 adds and manages the print job and print-job information of the print job every time print-job management is requested by the print-job interpreting unit 304 (step S603). Furthermore, the print-job managing unit 306 reports to the print-job information managing unit 305 the print-job information of the print job as a list creation request at the timing of addition of the print job (step S604). Using the received print-job information, the print-job information managing unit 305 creates the print-job information list 400 (step S605).

The print-job information managing unit 305 then transmits the created print-job information list to the RSS feeder 307 to request creation of an RSS feed (step S606). To request for creation of an RSS feed, the print-job information list is transmitted to the RSS feeder 307. The RSS feeder 307 converts the print-job information list into RSS format to publish it.

Specifically the RSS feeder 307 converts the print-job information list received from the print-job information managing unit 305 to a print-job information list in RSS format. With this print-job information list in RSS format, the print-job information list in RSS format stored in the buffer is updated (step S607). Furthermore, the RSS feeder 307 requests the list transmitting unit 303*b* of the image-forming-apparatus communication I/F 303 to publish the print-job information list in RSS format (step S608).

The list transmitting unit 303*b* then transmits the print-job information list in RSS format stored in the buffer of the RSS feeder 307 to the image forming apparatus 101 on the network NW.

If a print job is newly requested by the client PC 103 while the print-job information list in RSS format is published by the RSS feeder 307 (job addition), the print server 102 creates a new print-job information list by additionally writing new print-job information in the print-job information list 400 shown in FIG. 4 for updating.

Figure 7:
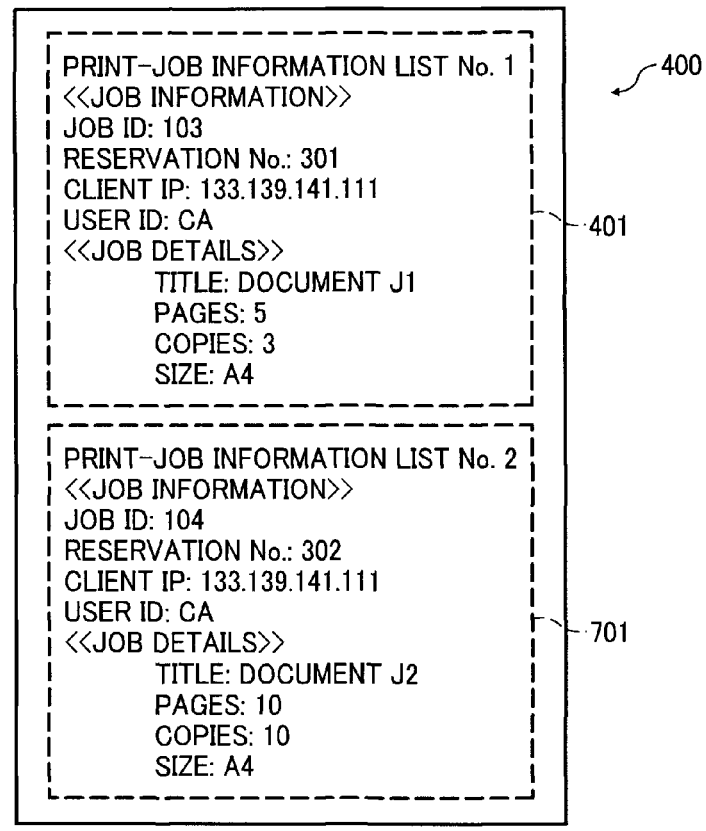
FIG. 7 is one example of an update print-job information list obtained by writing new print-job information in the existing print-job information list.

FIG. 7 is one example of a print-job information list which is obtained by additionally writing new print-job information 701 to the print-job information list 400 shown in FIG. 4. If a new print job is requested while the print-job information list 400 shown in FIG. 4 is published, print-job information 701 of the print job is added to the print-job information list 400. With this, the image forming apparatus 101 can timely recognize the print jobs stored in the print server 102.

First, the general outline of the image forming apparatus 101 is briefly explained. In an office or the like, an image forming apparatus, such as a printer or copier, has been often used. In recent years, an MFP that combines any or all of the functions of a printer, a copier, a facsimile machine, a scanner, etc. has been widely used. Such an MFP is used for the image forming apparatus 101 as a printing apparatus.

That is, the image forming apparatus 101 is configured as an MFP in which a copy function, a facsimile function, and a scanner function are added to a printer control system (printer function) and one printing unit is shared among these functions. The image forming apparatus 101 includes a communication control function. The network print system 100 is constructed under an environment such that other printers including a communication control function equivalent to that of the MFP are connected to the print server 102 via the network NW.

Next, the broad view of the image forming apparatus 101 is explained. A characteristic configuration of the image forming apparatus 101 as a printing apparatus resides in its control, in particular, an RSS reader function. In the following, a brief explanation of the image forming apparatus 101 is made including known configuration.

Figure 8:
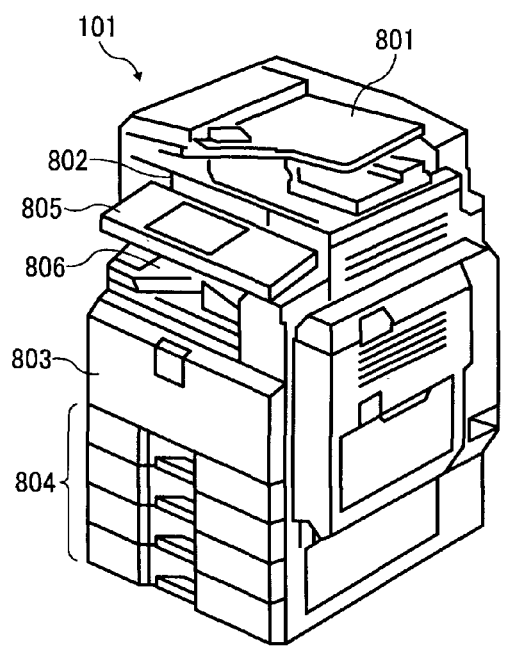
FIG. 8 is an external perspective view of one example of a multifunction product (MFP)

FIG. 8 is a general view of the image forming apparatus 101. The image forming apparatus 101 includes a feed/discharge unit (automatic document feeder (ADF)) 801 that sends a document to a scanner unit, a reading unit (scanner) 802 that reads the document to be printed, and an image forming unit (printer) 803 (which is not viewed since it is incorporated inside the apparatus body) that outputs a print. The image forming apparatus 101 further includes a sheet-feeding tray 804 that stores therein recording media (in FIG. 8, four trays are shown), an operating unit 805, and a sheet-discharge tray 806. As just described, the image forming unit (printer) 803 or the like is implemented in the image forming apparatus 101.

The feed/discharge unit 801 includes, for example, an ADF, a sorter, a finisher, an internal sheet-feeding mechanism, and others to feed and deliver a document taken in the copy function, the facsimile function, and the scanner function and an output sheet in the copy function, the facsimile function, and the printer function.

The reading unit 802 includes an optical reading device, such as a scanner, to optically read a document taken in the copy function, the facsimile function, and the scanner function for conversion to predetermined image data.

The image forming unit 803 includes, for example, a laser-type printer engine to print image data obtained by the copy function, the printer function, and the facsimile function. Those explained above are known and are merely remotely related to characteristic processes of the image forming apparatus 101, they are not explained in detail herein.

The image forming apparatus 101 has a merging function with the network NW (LAN). The following is an explanation of the configuration of the image forming apparatus 101 to achieve the merging function with the network NW. The configuration of the image forming apparatus 101 is explained with reference to FIG. 9.

Figure 9:
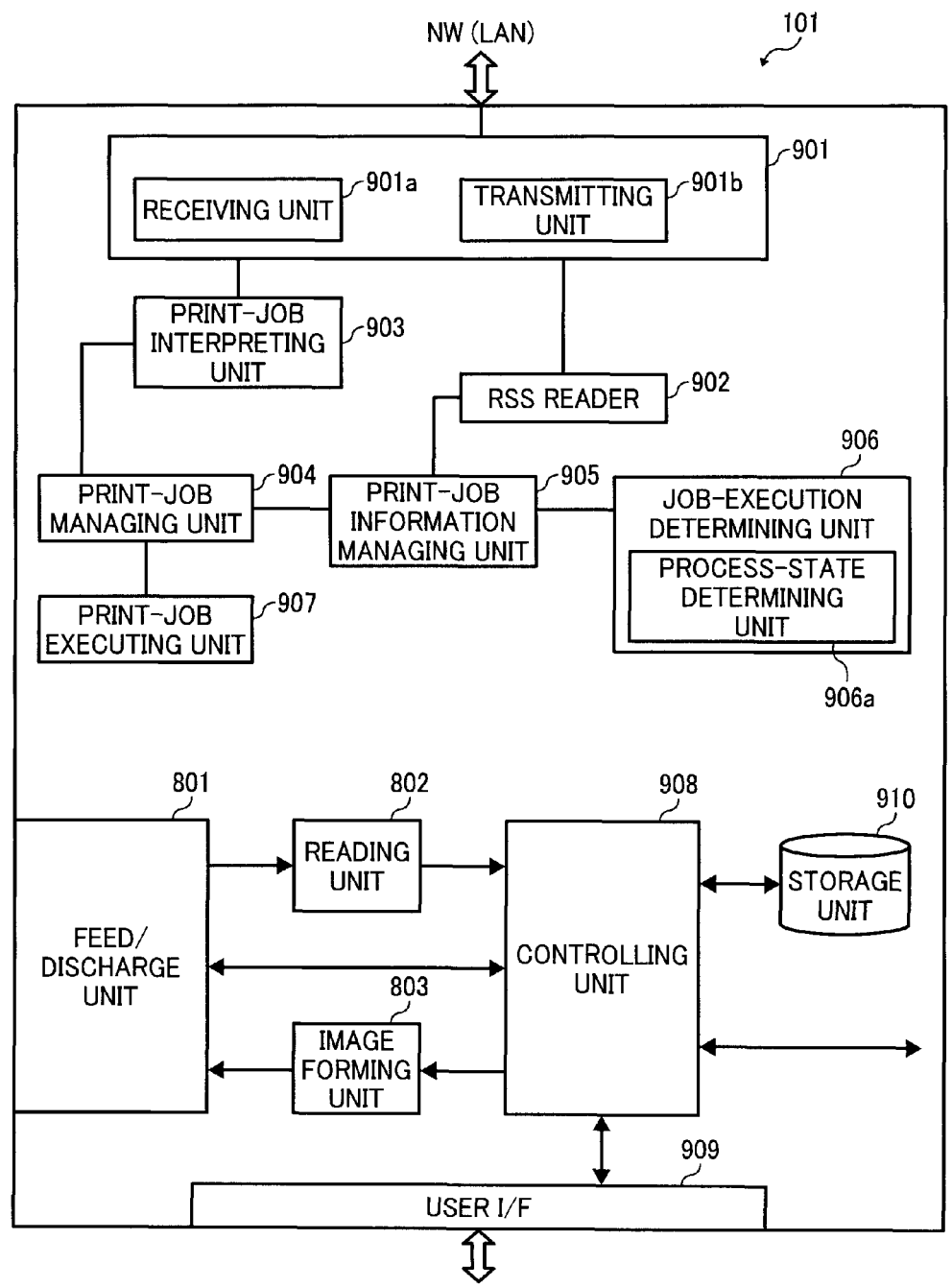
FIG. 9 is a schematic diagram of relevant part of an image forming apparatus (printing apparatus) shown in FIG. 1.

FIG. 9 is a block diagram of the image forming apparatus 101. The image forming apparatus 101 includes a network interface (print-server communication I/F) 901 and a storage unit 910 having a large-capacity memory, such as a hard disk device. That is, the image forming apparatus 101 includes a controlling unit 908, a user I/F 909, the print-server communication I/F (network interface) 901, and the storage unit 910.

Figure 10:
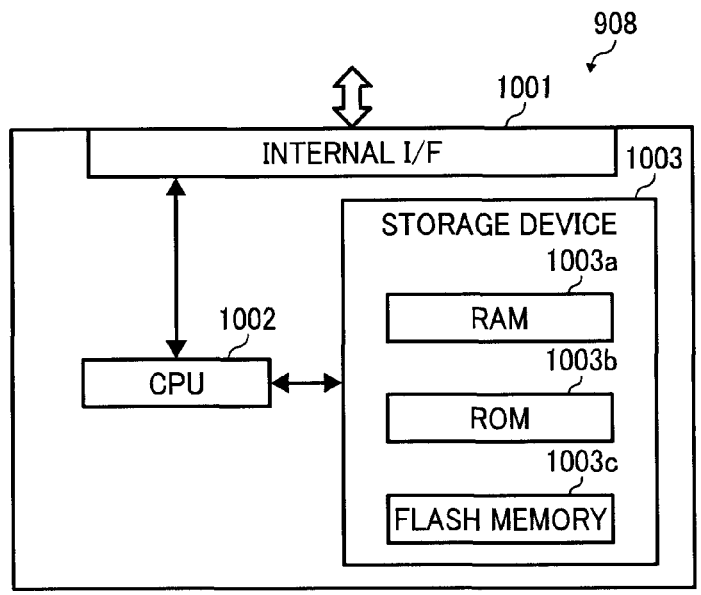
FIG. 10 is a block diagram of a controlling unit shown in FIG. 9.

FIG. 10 is a block diagram of the controlling unit 908. The controlling unit 908 controls the image forming apparatus 101, and includes an internal I/F 1001, a Central Processing Unit (CPU) 1002, and a storage device 1003.

The internal I/F 1001 includes, for example, a bus interface, connecting the controlling unit 908 and the other components in the image forming apparatus 101 for transmission and reception of an electric signal.

The CPU 1002 includes an arithmetic circuit, such as an Arithmetic and Logic Unit (ALU), executing a computer program stored in the storage device 1003 to control the image forming apparatus 101.

The storage device 1003 stores therein a computer program to be executed by the CPU 1002 and data. The storage device 1003 includes a Random Access Memory (RAM) 1003*a*, a Read Only Memory (ROM) 1003*b*, and a flash memory 1003*c*.

The RAM 1003*a* includes, for example, a Dynamic Random Access Memory (DRAM), functioning as a main memory for use as a work area of the CPU 1002. That is, the computer program stored in the ROM 1003*b* and the data stored in the flash memory 1003*c* are loaded to the RAM 1003*a* and are executed by the CPU 1002. Examples of the ROM 1003*b* include a mask ROM and an Electrically Erasable Programmable ROM (EEPROM).

The flash memory 1003*c* includes a rewritable semiconductor storage device, such as EEPROM, storing various data, such as display data corresponding to a screen to be displayed on a display (displaying unit) included in the operating unit 805 via the user I/F 909.

Returning to FIG. 9, the user I/F 909 includes, for example, an operation panel and a display (the display panel) receiving input from the user and displaying predetermined information.

The storage unit 910 includes, for example, a rewritable storage device, such as a hard disk device, storing image data taken in through the copy function, the facsimile function, and the scanner function and image data input through the printer function.

For a process associated with a print service of receiving a print-job information list in RSS format from the print server 102, the image forming apparatus 101 further includes an RSS reader 902, a print-job interpreting unit 903, a print-job managing unit 904, a print-job information managing unit 905, a job-execution determining unit 906, and a print-job executing unit 907, which are controlled by the controlling unit 908.

Figure 11:
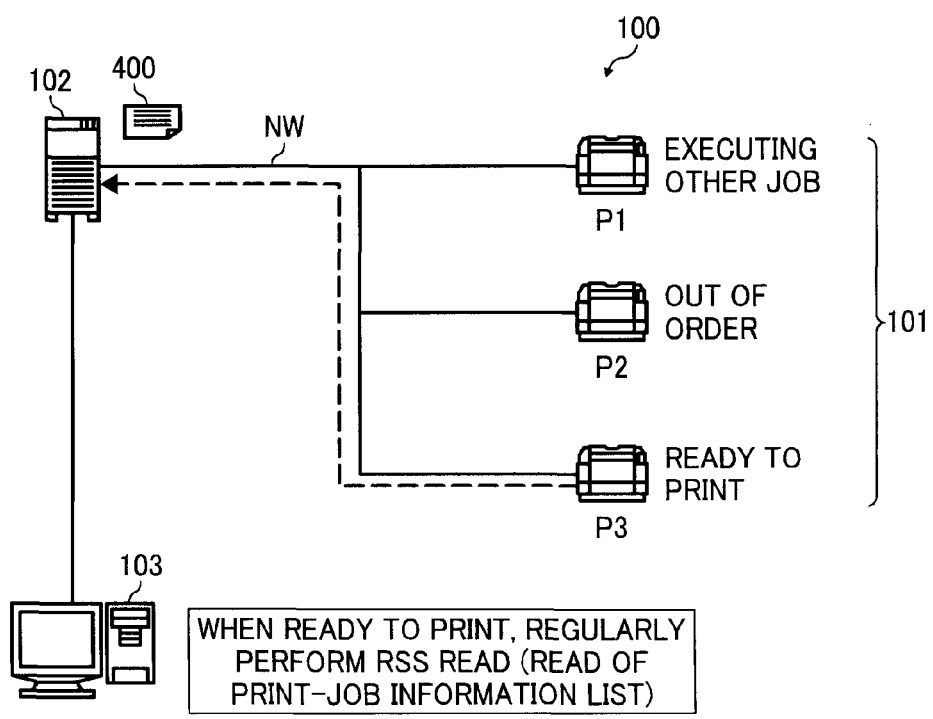
FIG. 11 is a conceptual diagram for explaining part of a process performed by the image forming apparatus.

FIG. 11 is a schematic diagram for explaining a process performed by the image forming apparatus 101 for receiving a print-job information list in RSS format from the print server 102. Referring to FIGS. 9 and 11, functions of each unit associated with a print service are described below.

The print-server communication I/F 901 includes a receiving unit 901a and a transmitting unit 901b. The receiving unit 901a receives a print-job information list in RSS format from the print server 102. The receiving unit 901a receives a print job from the print server 102. The transmitting unit 901b transmits a transmission request for transmission of a print job specified by the job-execution determining unit 906, explained below as an execution target, to the print server 102.

The print-server communication I/F (LAN I/F board) 901 includes, for example, a predetermined NIC and a telephone-line connection interface, connecting the image forming apparatus 101 with the network NW and the public switched telephone network (PSTN) 40, thereby performing communication with each node on the network NW, such as the print server 102 and facsimile transmission and reception. The print-server communication I/F 901 is assumed to perform a predetermined encryption, such as SSL, at the time of communication via the network NW.

The RSS reader 902 periodically obtains a print-job information list in RSS format from the print server 102 via the print-server communication I/F 901 to convert the obtained print-job information list in RSS format to create a print-job information list. The RSS reader 902 obtains various feeds on the network NW (for example, RSS and Atom) for feed management. For example, the feed management is to manage an interval for obtaining the print-job information list in RSS format and manage whether the print-job information list in RSS format is to be stored in the buffer.

The RSS reader 902 manages whether the user (for example, the image forming apparatus 101) has read (opened) the converted print-job information list. With this, the converted print-job information list can be deleted from the print-job information managing unit 905.

According to the first embodiment, the print-job information list converted to RSS format is obtained. However, for example, data converted in another format can be obtained as long as data to be published by the feeder is obtained.

The print-job interpreting unit 903 interprets information in the print job, and converts the data to data to be handled in the print server 102.

The print-job managing unit 904 includes a memory store and manage a plurality of print jobs. The print-job managing unit 904 stores and manages the print job converted by the print-job interpreting unit 903.

The print-job information managing unit 905 manages and updates the print-job information list.

The print-job information managing unit 905 stores the print-job information list converted by the RSS reader 902 in the buffer. Also, as explained above, the print-job information list stored in the print-job information managing unit 905 is updated with the latest print-job information list obtained by converting the print-job information list in RSS format periodically obtained by the RSS reader 902.

The job-execution determining unit 906 specifies a print job to be executed, based on the print-job information list converted by the RSS reader 902.

The job-execution determining unit 906 determines whether the print-job information is included in the print-job information list. If the print-job information is included, a print job corresponding to the print-job information is specified as a print job to be executed. As a transmission request for the print job, for example, the job ID and the reservation number included in the print-job information are transmitted to the print-server communication I/F 901 together with the IP address of the apparatus.

The job-execution determining unit 906 includes a process-state determining unit 906a. The process-state determining unit 906a determines whether the presence or absence of the print job being processed in the image forming apparatus 101. When it is determined by the process-state determining unit 906a that no print job being processed by the process-state determining unit 906a is present, the job-execution determining unit 906 specifies a print job to be executed next.

On the other hand, if it is determined by the process-state determining unit 906a that a print job being processed is present, the RSS reader 902 stops obtaining the print-job information list in RSS format from the print server 102. In the first embodiment, a determination as to whether to obtain the print-job information list in RSS format is made based on the presence or absence of a print job. However, for example, obtainment of the print-job information list in RSS format is stopped when it is determined that a print job is not to be executed because the function of the image forming apparatus cannot be used due to out of order, sheet shortage, or the like.

The print-job executing unit 907 reads the print job stored in the print-job managing unit 904 to control the image forming unit 803 according to the print job for executing a print process.

Next, the operation for a print service is explained. When the client PC 103 transmits a print job to the print server 102, as explained above, the print server 102 interprets print-job information of the print job requested by the client PC 103 and converts the print-job information list to a print-job information list in RSS format shown in FIG. 4. Then, the print-job information list obtained through conversion is published as an RSS feed on the network NW (see FIGS. 5 and 6).

On the other hand, the image forming apparatus 101 includes an RSS reading function, obtaining, at predetermined intervals, the print-job information list in RSS format published by the print server 102 based on the IP address of the print server 102 registered in the apparatus (see FIG. 11). Based on the print-job information list created by converting the obtained the print-job information list in RSS format, the image forming apparatus 101 specifies a print job to be executed. When a print job is specified, a transmission request for the print job (including the job ID, reservation number, IP address information of the apparatus) is transmitted to the print server 102. However, if execution of the print job is impossible because the apparatus is executing another print job or the functions of the apparatus are incomplete (such as out of order or sheet shortage), the operation of reading the print-job information list is not performed at predetermined intervals.

Figure 12:
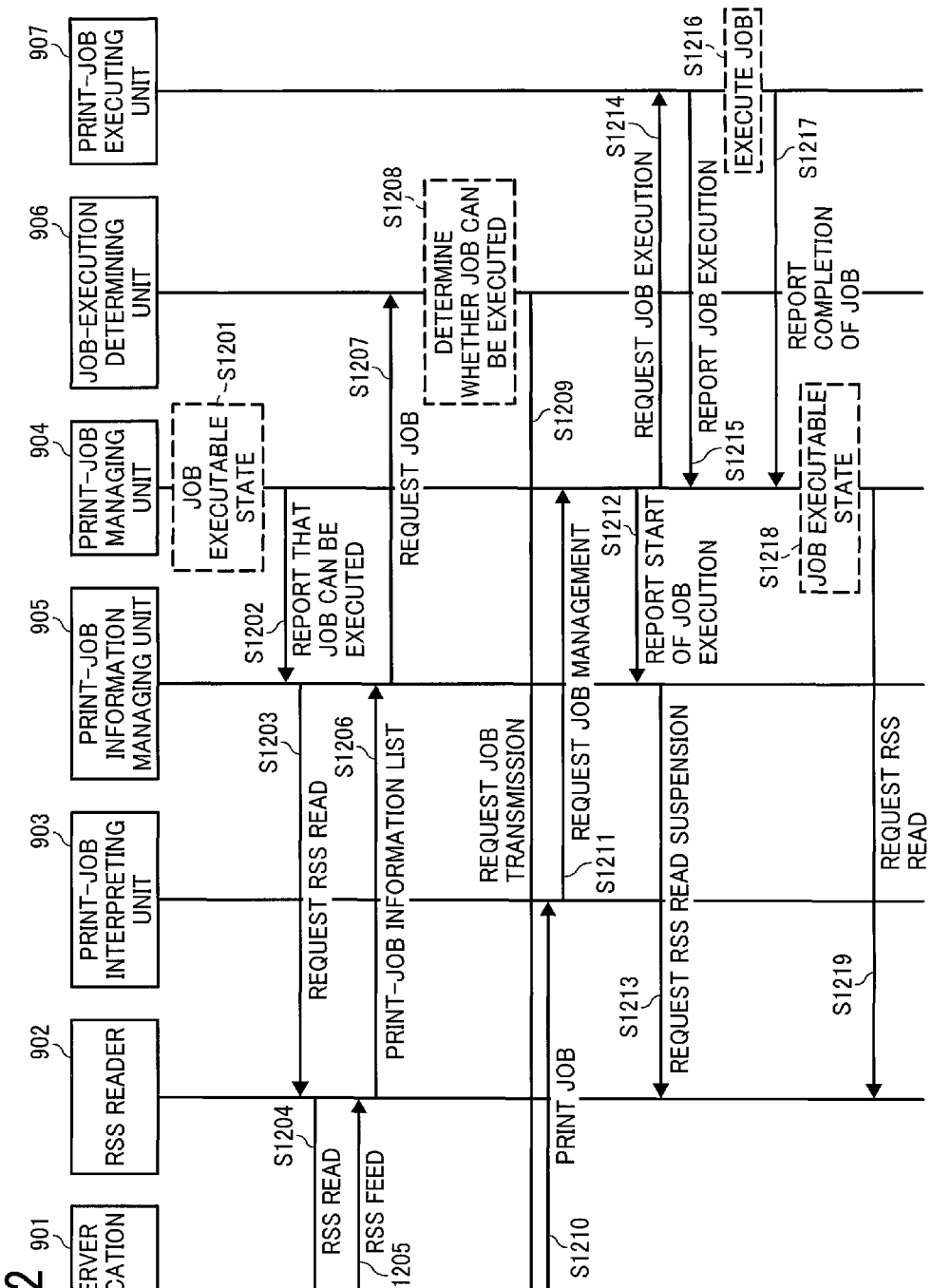
FIG. 12 is a sequence diagram of an operation procedure of the image forming apparatus.

FIG. 12 is a sequence diagram of the process of receiving a print-job information list in RSS format from the network print system 100 to transmit a transmission request for a print job.

As a first half of the process, when the print-job managing unit 904 determines that the print job can be executed (step S1201), the print-job managing unit 904 reports to the print-job information managing unit 905 that a print job can be executed (step S1202). The print-job information managing unit 905 requests to read (obtain) the print-job information list in RSS format to the RSS reader 902 (step S1203).

The RSS reader 902 reads the print-job information list in RSS format published by the print server 102 through the print-server communication I/F 901 (step S1204).

The print-server communication I/F 901 obtains the print-job information list in RSS feed format from the print server 102 (step S1205). The RSS reader 902 converts the received print-job information list in RSS format, and then transmits the converted print-job information list to the print-job information managing unit 905 (step S1206). The print-job information managing unit 905 transmits the print-job information list to the job-execution determining unit 906 for requesting execution of the print job (step S1207).

The job-execution determining unit 906 specifies a print job to be executed based on the print-job information list received from the print-job information managing unit 905, and determines whether the apparatus is in a state capable of processing the print job (step S1208). When the print job specified based on the print-job information list can be executed, the job-execution determining unit 906 requests the print-server communication I/F 901 to transmit the print job (step S1209). In response to the request, the print-server communication I/F 901 requests the print server 102 to transmit the print job.

Figure 13:
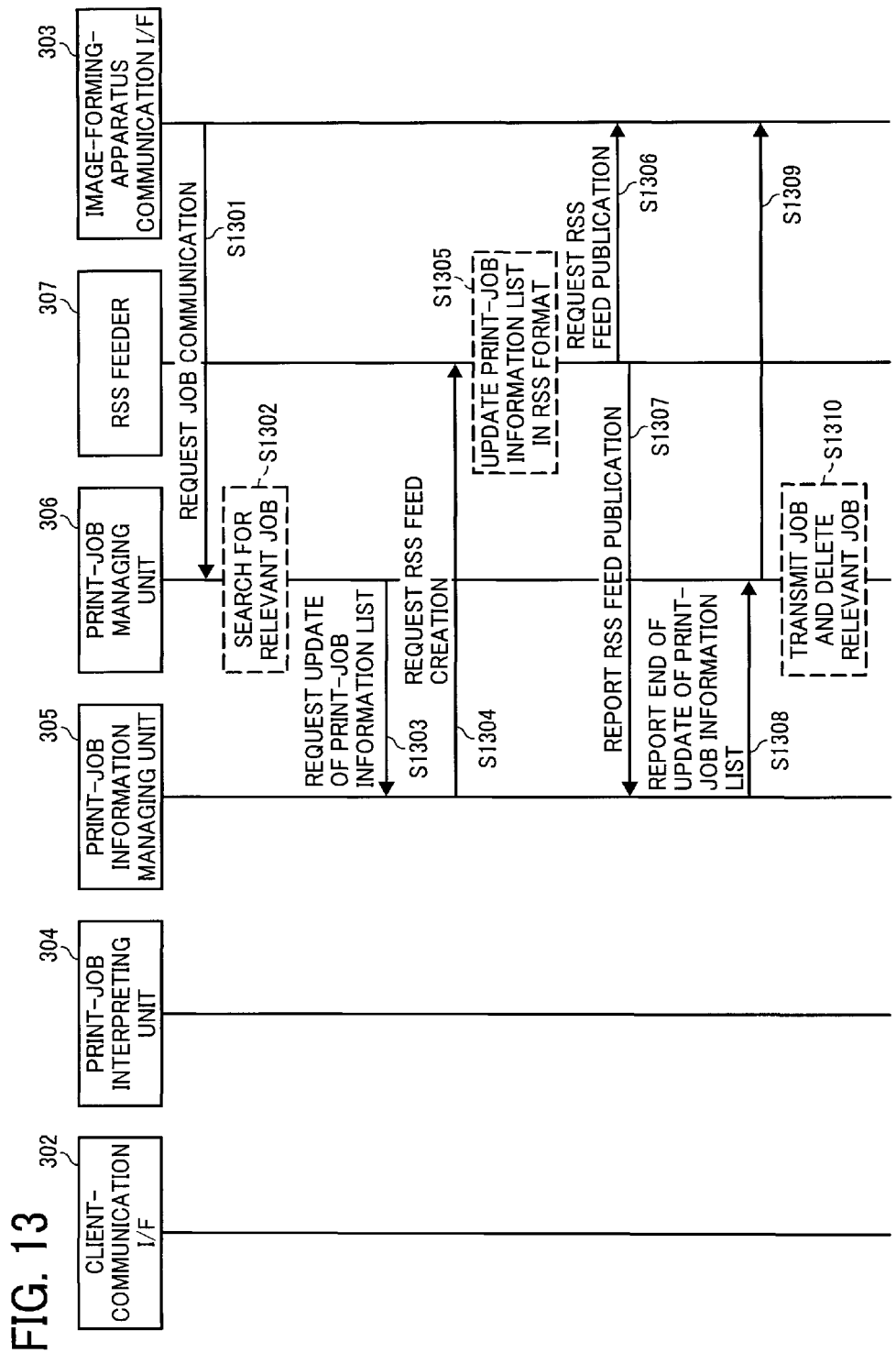
FIG. 13 is a sequence diagram for explaining part of an operation procedure performed by the print server.

FIG. 13 is a sequence diagram for explaining a process performed by the print server 102 for transmitting a print job to the image forming apparatus 101 upon receiving a request for the print job. In FIG. 12, subsequent processes at steps S1210 executed upon waiting for a response on a print server side are explained after explaining the process of the print server 102 below.

Upon receiving a request for a print job from the image forming apparatus 101, the image-forming-apparatus communication I/F 303 requests the print-job managing unit 306 to transmit a print job (step S1301). The print-job managing unit 306 searches print jobs yet to be processed (yet to be requested) at this point for a print job coinciding with the transmission request (step S1302). If a print job corresponding to the request is stored, the print-job managing unit 306 transmits a report of deletion of the print job and the print-job information to the print-job information managing unit 305, thereby requesting update of the print-job information list (step S1303).

The print-job information managing unit 305 creates a new print-job information list from which the print job received from the print-job managing unit 306 is deleted, and transmits the created print-job information list to the RSS feeder 307 to request creation of the RSS feed (step S1304).

The RSS feeder 307 converts the received print-job information list to a print-job information list in RSS format, and updates the print-job information list stored in the buffer (step S1305). Then, the RSS feeder 307 requests the image-forming-apparatus communication I/F 303 to publish the print-job information list in RSS format (step S1306). The image-forming-apparatus communication I/F 303 publishes the print-job information list stored in the RSS feeder 307 to the image forming apparatus 101 on the network NW.

When the print-job information list in RSS format is published, the RSS feeder 307 reports to the print-job information managing unit 305 that the print-job information list in RSS format has been published (step S1307).

Next, the print-job information managing unit 305 reports to the print-job managing unit 306 that update of the print-job information list in RSS format has been completed (step S1308).

Upon completion of the update of the print-job information list in RSS format, the print-job managing unit 306 requests the image-forming-apparatus communication I/F 303 to transmit the print job based on the IP address information included in the request (step S1309). In response to the request, the image-forming-apparatus communication I/F 303 transmits the print job to the transmission destination indicated by the IP address information.

The print-job managing unit 306 deletes the transmitted print job (step S1310). At this time, the information about the image forming apparatus 101 (such as the IP address) may be not stored but discarded. In this manner, a new print-job information list in RSS format is created and published at timing of increasing or decreasing print jobs (list updating process).

Returning to FIG. 12, the operation of the image forming apparatus 101 after receiving the print job from the print server 102 is explained.

When the print-server communication I/F 901 receives the print job from the print server 102 (step S1210), the print-job interpreting unit 903 converts the received print job to data readable in the image forming apparatus 101, and then transmits the converted print job to the print-job managing unit 904, thereby requesting management of the print job (step S1211).

Next, the print-job managing unit 904 reports to the print-job information managing unit 905 the start of the print job (step S1212). The print-job information managing unit 905 requests the RSS reader 902 to suspend reading of the print-job information list in RSS format (step S1213). The print-job managing unit 904 requests the print-job executing unit 907 to execute the received print job (step S1214).

The print-job executing unit 907 reports execution of the print job to the print-job managing unit 904 (step S1215), and controls the image forming unit 803 to execute the print job (step S1216). Then, upon completion of the print job, the print-job executing unit 907 reports to the print-job managing unit 904 that the print job has been completed (step S1217).

Upon receipt of a report of completion of the print job, the print-job managing unit 904 transits again to a print-job-executable state (step S1218), and requests the RSS reader 902 to read the print-job information list in RSS format (step S1219). In response to the request, read of the print-job information list in RSS format by the RSS reader 902 is restarted. In this manner, a series of processes for the specific print job in the system is completed.

In this manner, according to the first embodiment, the print server does not have to register or manage the information about each image forming apparatus that transmits a print job, thereby reducing a load on the print server.

A network print system according to a second embodiment of the present invention is explained. According to the second embodiment, in the system environment shown in FIG. 1, as a result of interpretation by an image forming apparatus approximately similar to that in the first embodiment about the print-job information list in RSS format received from a print server, a requested function described as print-job information are compared with the functions of the apparatus (see FIG. 14).

The print server 102 of the second embodiment is basically similar to that of the first embodiment except for the processes of the print-job information managing unit 305 and the print-job managing unit 306. Thus, the same explanation is not repeated.

According to the second embodiment, when print-job information received from the print-job managing unit 306 includes requested-function information, the print-job information managing unit 305 creates a print-job information list further including requested-function information for each print job.

The requested-function information represents at least one of a function of the image forming apparatus required for executing the print job including the requested-function information and a function required for the image forming apparatus that executes the print job. Examples of the requested-function information include a duplex printing function, a color printing function, a printable sheet size (such as A4, A3, and B4), a sorting function, a stamp printing function, and a printing speed (pages per minute (PPM)).

Figure 14:
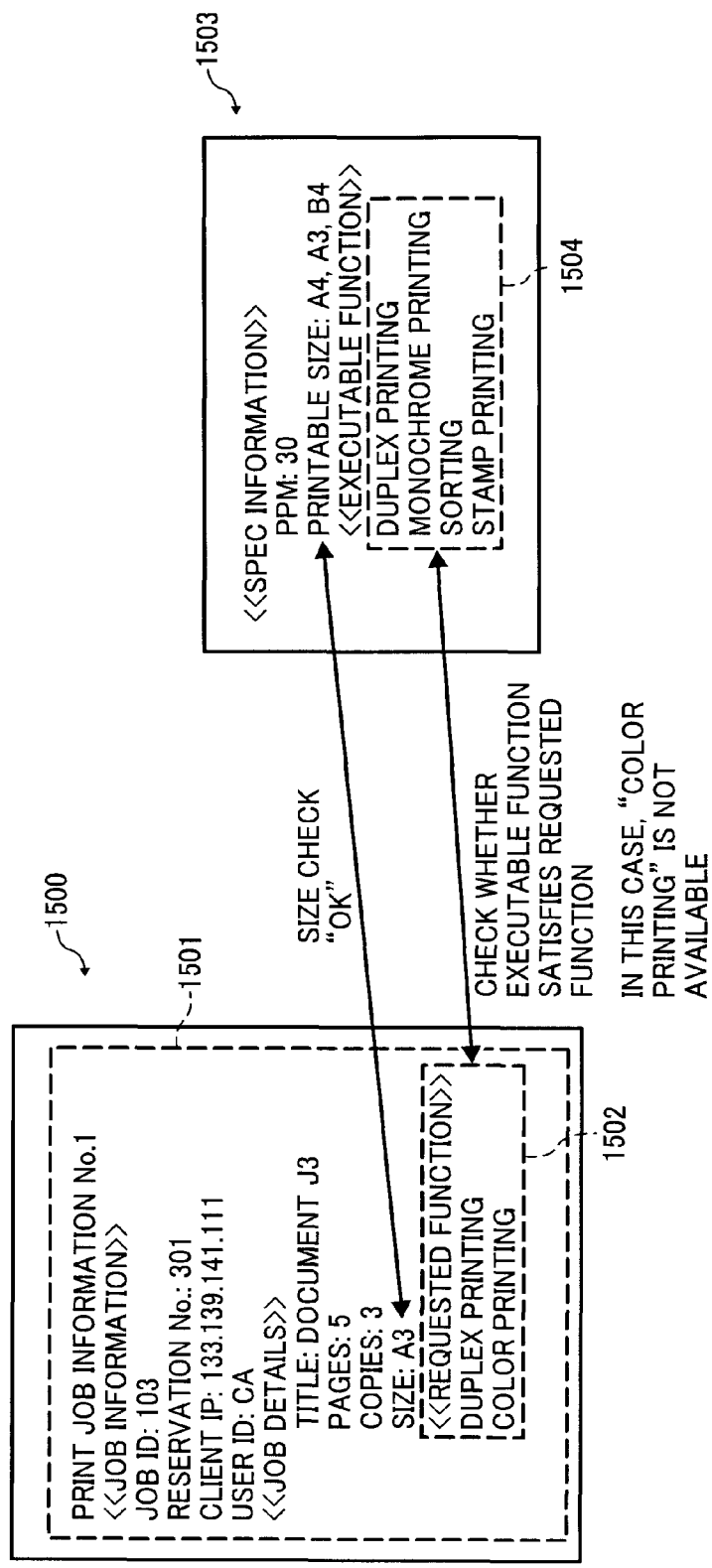
FIG. 14 is one example of a print-job information list created by the print server and spec information of the image forming apparatus stored therein.

FIG. 14 is one example of a print-job information list created by the print-job information managing unit 305 and spec information of the image forming apparatus 101.

A print-job information list 1500 created by the print-job information managing unit 305 includes requested-function information (for example, duplex printing and color printing) 1502 for each print-job information 1501.

When a print job requested by the client PC 103 includes requested-function information, the print-job managing unit 306 stores the requested-function information together with the print job. The print-job managing unit 306 then transmits, a report of addition or deletion of the print job and also the print-job information including the requested-function information to the print-job information managing unit 305.

Figure 15:
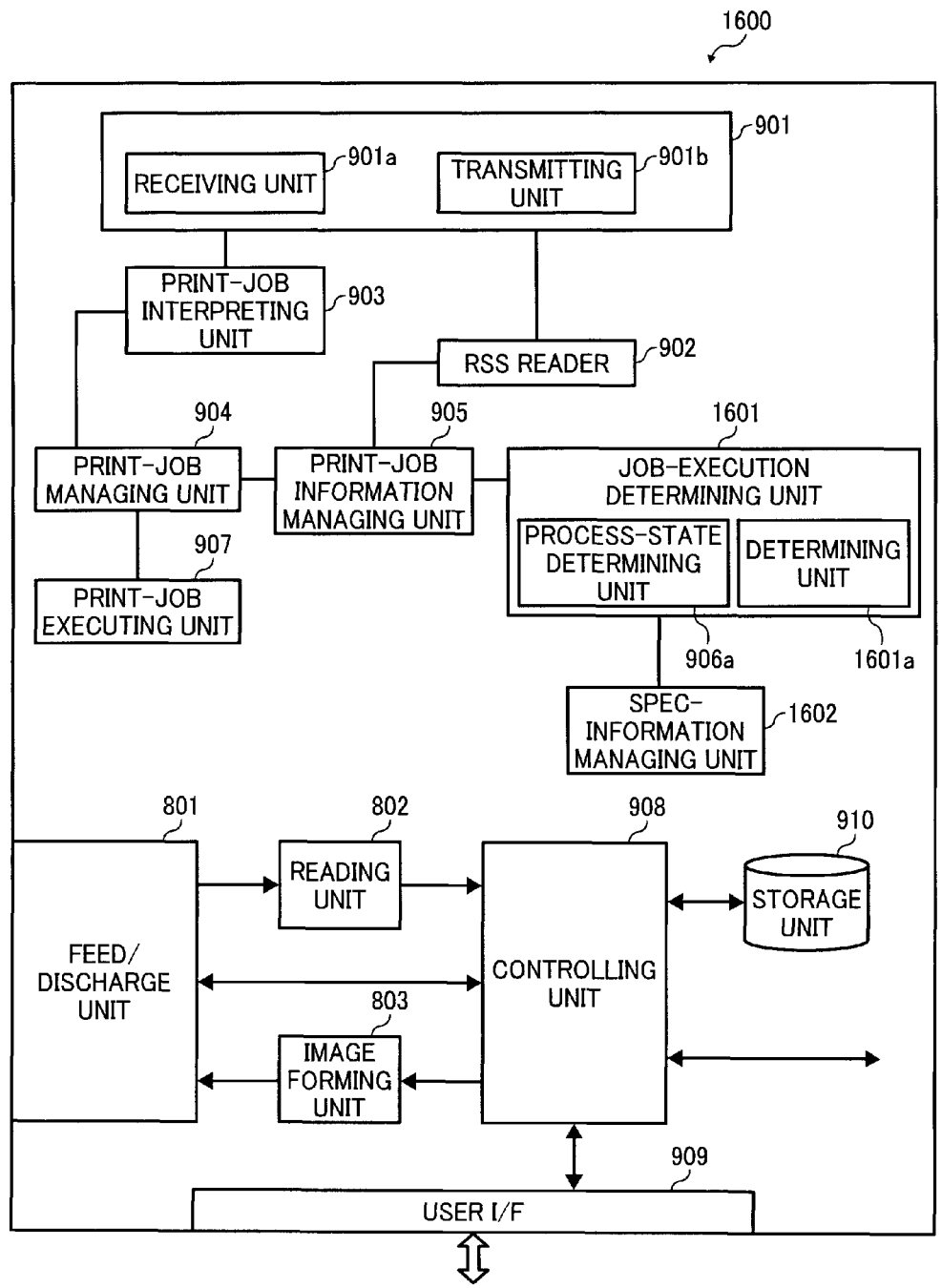
FIG. 15 is a block diagram of an image forming apparatus according to a second embodiment of the present invention.

FIG. 15 is a block diagram of an image forming apparatus 1600. The image forming apparatus 1600 is basically similar to the image forming apparatus 101 except that the job-execution determining unit 906 is replaced by a job-execution determining unit 1601. The job-execution determining unit 1601 operates differently from the job-execution determining unit 906, and includes a spec-information managing unit 1602. Like reference numerals refer to portions corresponding to those in the first embodiment, and the same explanation is not repeated.

When the job-execution determining unit 1601 has determined the print job can be executed based on the print-job information list, the image forming apparatus 1600 determines whether the print job can be executed with the function thereof.

The spec-information managing unit 1602 stores function information indicative of functions of the apparatus itself, such as list information about usable functions. Also, the print-job executing unit 907 is responsible for executing the print job.

The spec-information managing unit 1602 stores therein spec information indicative of the functions of the image forming apparatus 1600. Spec information 1503 shown in FIG. 14 is an example of the spec information stored as function information in the spec-information managing unit 1602.

The spec information 1503 represents information indicative of functions included in the apparatus itself and specifications of the apparatus itself. Examples of the specifications of the image forming apparatus include a printing speed (PPM) thereof and a printable sheet size. Also, examples of the functions include duplex printing, monochrome printing, sorting, and stamp printing.

Returning to FIG. 15, the job-execution determining unit 1601 includes the process-state determining unit 906a and a determining unit 1601a. When it is determined by the process-state determining unit 906a that the print job can be processed and it is determined by the determining unit 1601a that the apparatus satisfies the function for executing the print job, the job-execution determining unit 1601 specifies the print job as a print job including the requested-function information as a determination target.

The determining unit 1601a determines whether the function indicated in the spec information stored in the spec-information managing unit 1602 satisfies the function indicated in the requested-function information for each print job included in the print-job information list managed by the print-job information managing unit 905.

In the example of FIG. 14, the determining unit 1601a compares the requested-function information 1502 included in the print-job information list 1500 and a function 1504 included in the spec information 1503, finding that color printing included in the requested-function information 1502 is not included in the function 1504 of the spec information. Therefore, the determining unit 1601a determines that the apparatus does not satisfy the function for executing the print job.

Figure 16:
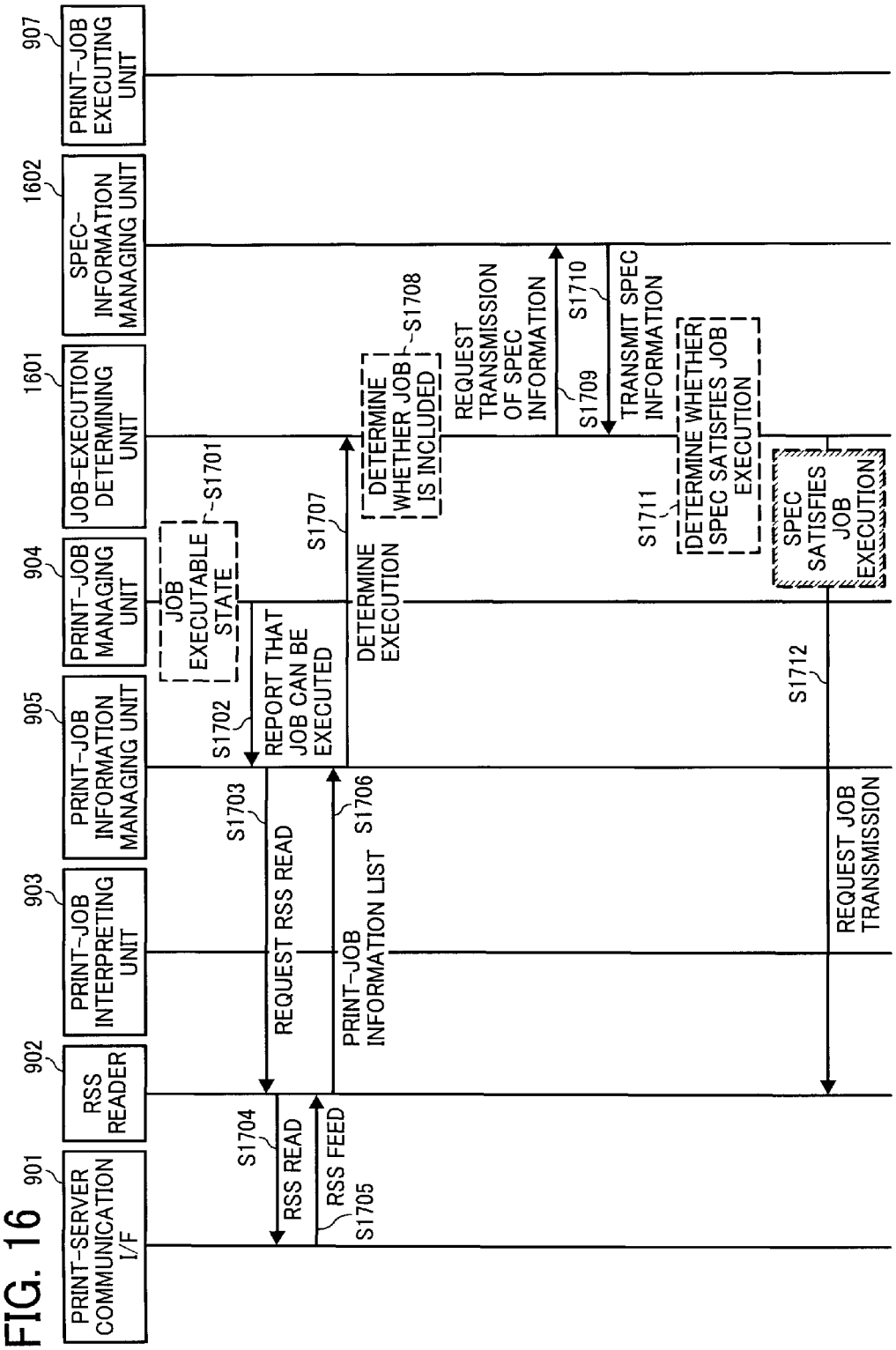
FIG. 16 is a sequence diagram of one example of a process performed by the image forming apparatus shown in FIG. 15.

FIG. 16 is a sequence diagram of a process of obtaining a print-job information list in RSS format and transmitting a request for a print job by the image forming apparatus 1600.

First, as previously described for steps S1201 to S1206 of FIG. 12, a print-job information list in RSS format is obtained by the RSS reader 902 from a print server 1400 (steps S1701 to S1706).

Next, the print-job information managing unit 905 transmits the obtained print-job information list to the job-execution determining unit 1601 to request to determine whether to execute the print job (step S1707). The job-execution determining unit 1601 determines whether the print job is included in the print-job information list (step S1708).

Then, the job-execution determining unit 1601 requests the spec-information managing unit 1602 to transmit the spec information (step S1709).

Upon receipt of the request from the job-execution determining unit 1601, the spec-information managing unit 1602 transmits the spec information of the apparatus to the job-execution determining unit 1601 (step S1710).

The job-execution determining unit 1601 determines whether the function indicated by the spec information satisfies the function indicated by the requested-function information for each print job included in the print-job information list (step S1711). When the function satisfies the function indicated by the requested-function information, the job-execution determining unit 1601 requests the RSS reader 902 to transmit a request for the print job to the print server 1400 (step S1712).

As explained above, according to the second embodiment, the image forming apparatus determines whether the print job can be executed with the function of the apparatus based on the requested-function information included in the print-job information list published by the print server, and transmits a request for the print job. Therefore, image forming apparatuses differing in function can be disposed within the network print system.

Next, a network print system according to a third embodiment of the present invention is explained. According to the third embodiment, in the network print system environment as explained above, when the print-job information list published by the print server 102 has described therein information on a plurality of jobs, an image forming apparatus of the third embodiment determines the number of jobs that the image forming apparatus requests the print server 102 to transmit based on the printing speed (hereinafter, "PPM") thereof.

The image forming apparatus of the third embodiment is basically similar to the image forming apparatus 101 and the image forming apparatus 1600 except for the process of the job-execution determining unit 906. Thus, the same explanation is not repeated.

Figures 17, 18:
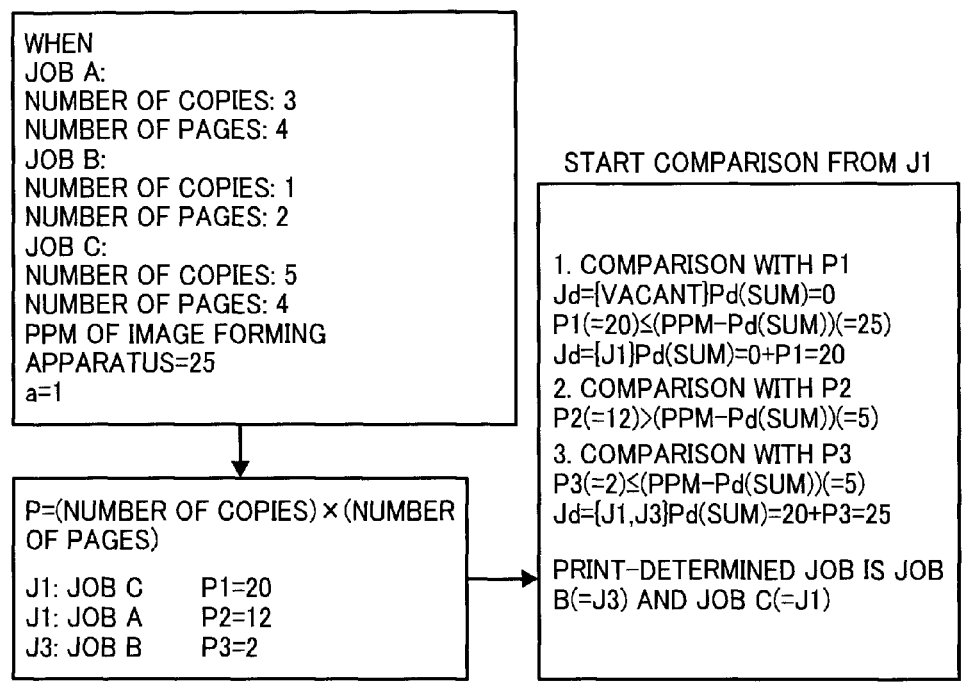
FIG. 17 is a schematic diagram for explaining one example of a process performed by an image forming apparatus according to a third embodiment of the present invention.
FIG. 18 is one example of a print-job information list created by a print server according to a fourth embodiment of the present invention.

According to the third embodiment, when a plurality of print jobs are included in the print-job information list managed by the print-job information managing unit 905, the job-execution determining unit 906 determines a print job to be executed based on the processing speed of the image forming apparatus. FIG. 17 depicts a process of determining a print job when three jobs are included in the print-job information list.

It is herein assumed that the number of prints (P) for each print job=the number of copies×the number of pages of a document. Also, in the print-job information list, a print job with the maximum number of prints is taken as J1, and the number of prints of print J1 is taken as P1. Furthermore, print jobs with descending order of the number of prints are taken as J2, J3, . . . , Jn, and the numbers of prints are taken as P2, P3, . . . , Pn.

In the example shown in FIG. 17, the number of prints of a job A (the number of copies: 3, the number of pages of a document: 4) is 12; the number of prints of a job B (the number of copies: 1, the number of pages of a document: 2) is 2; and the number of prints of a job C (the number of copies: 5, the number of pages of a document: 4) is 20.

Therefore, the job C is with J1, the job A is with J2 and then the job B is with J3 in the descending order of the number of prints. Therefore, P1=20 for J1 (job C), P2=12 for J2 (job A), and P3=2 for J3 (job B).

A set of print jobs determined as those to be printed (hereinafter, "print-determined jobs") is taken as Jd={Jd1, Jd2, . . . }, and the total of the number of prints (Pd1+Pd2+ . . . ) is represented as Pd (SUM).

In the following equations, "a" represents a weight for the PPM and is constant for $0 \leq a$. This value is assumed to be arbitrarily varied by the user. In the example shown in FIG. 17, it is assumed that PPM=25 and the weight a=1.

First, from the P1 with the largest number of prints, $P\alpha$ and $(a \times PPM-Pd(SUM))$ are compared.

Next, when $P\alpha \leq (a \times PPM-Pd(SUM))$, a print job $J\alpha$ is determined as a print-determined job and is included in the job set Jd. Then, $P\alpha$ is added to the Pd(SUM).

On the other hand, when $P\alpha > (a \times PPM-Pd(SUM))$, $J\alpha$ is not included in the job set Jd.

Next, from the remaining jobs, the job with the second largest number of print $(P\alpha+1)$ and $(a \times PPM-Pd(SUM))$ are compared again.

Thus obtained job set Jd is taken as final print-determined jobs.

However, if the final Jd is vacant, Jn with the smallest number of prints is included in Jd, thereby Jd={Jn}.

For example, in the example shown in FIG. 17, a comparison is started from J1. Since J1 has the largest number of prints but the job set Jd of print-determined jobs is vacant (=0), the total number of prints Pd(SUM) is 0. Next, P1 (=20), which is the number of prints for J1, and (PPM−Pd(SUM)) are compared. Here, Pd(SUM)=0, and therefore (PPM−Pd(SUM)) is 25. Therefore, P1≦(PPM−Pd(SUM)) holds. Thus, J1 is determined as a print-determined job and is included in the job set Jd. Then, P1(=20) is added to Pd(SUM).

Next, a comparison of J2 is started. With the process explained above, the job set Jd of print-determined jobs is P1(=20), and therefore the total number of prints at this time, that is, Pd(SUM) is 20. Next, P2 (=12), which is the number of prints for J2, and (PPM−Pd(SUM)) are compared. Here, Pd(SUM)=20, and therefore (PPM−Pd(SUM)) is 5. Therefore, P2>(PPM−Pd(SUM)) holds. Thus, J2 is not included in the job set Jd.

Next, a comparison of J3 is started. With the process explained above, the job set Jd of print-determined jobs is P1(=20), and therefore the total number of prints at this time, that is, Pd(SUM) is 20. Next, P3 (=2), which is the number of prints for J3, and (PPM−Pd(SUM)) are compared. Here, Pd(SUM)=20, and therefore (PPM−Pd(SUM)) is 20. Therefore, P3≦(PPM−Pd(SUM)) holds. Thus, J3 is determined as a print-determined job and is included in the job set Jd. Then, P3 (=2) is added to Pd(SUM).

With the process above, in the example shown in FIG. 17, the job B and the job C are determined as print-determined jobs. Then, the job-execution determining unit 1801 transmits requests for transmitting the job B and the job C to the printer server 102.

As explained above, according to the third embodiment, a print job for requesting transmission can be determined according to the processing speed of the image forming apparatus. Therefore, efficiency in processing print jobs over the entire network print system can be increased.

A network print system according to a fourth embodiment of the present invention is explained. According to the fourth embodiment, in the network print system environment as explained above, when a print job is requested to the print server, the client PC can transmit a print condition including identification information for identifying a printing apparatus to execute the print job (for example, an IP address) and the requested-function information according to the second embodiment (for example, PPM) together with the print job. That is, the client PC specifies a condition of the printing apparatus that execute the print job, thereby reflecting an intention regarding the printing apparatus desired by the user to print. FIG. 18 is a schematic diagram of a specific example of a print condition 2001 included in a print-job information list created by the print server according to the fourth embodiment. The print server 102 according to the fourth embodiment is basically similar to that of the above embodiments except for the processes performed by the print-job information managing unit 305 and the print-job managing unit 306. Thus, the same explanation is not repeated.

When a print condition is including in the print-job information received from the print-job managing unit 306, the print-job information managing unit 305 creates a print-job information list further including the print condition for each print job.

Upon receipt of a print job including a print condition from the client PC 103, the print-job managing unit 306 stores therein the print job. Then, the print-job managing unit 306 transmits a report of addition or deletion of the print job and also print-job information including the print condition to the print-job information managing unit 305.

In this manner, the print server 102 creates a print-job information list including a print condition. The operation at the print server 102 side is similar to that in the first embodiment, and therefore, is not repeatedly explained. Then, if a print condition irrelevant to those in the image forming apparatus is present at the time of interpreting the print-job information list, the image forming apparatus receiving the published print-job information list in RSS format performs control so that a request for the print job to the print server 102 is not performed. The comparing scheme of the image forming apparatus in this case is basically similar to that already explained in the previous embodiments, and the job-execution determining unit determines whether the print job can be executed.

Figure 19:
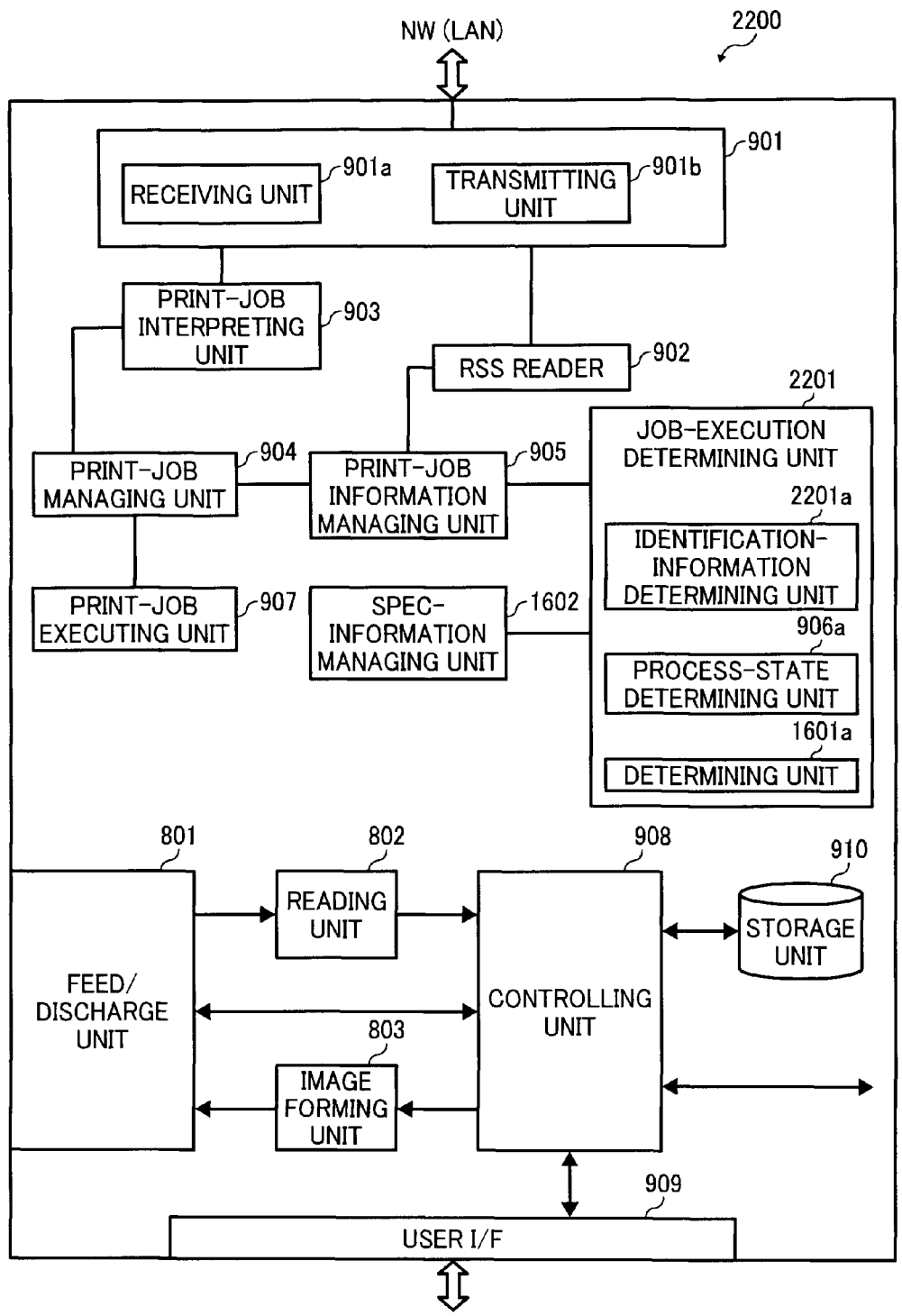
FIG. 19 is a block diagram of an image forming apparatus according to the fourth embodiment.

FIG. 19 is a block diagram of an image forming apparatus 2200 according to the fourth embodiment. The image forming apparatus 2200 is basically similar to the image forming apparatus 1600 except for a job-execution determining unit 2201. Thus, the same explanation is not repeated. In the image forming apparatus 2200, the job-execution determining unit 2201 determines whether the print job is a job requested with respect to the apparatus based on the print-job information list.

The job-execution determining unit 2201 includes the process-state determining unit 906a, the determining unit 1601a, and an identification-information determining unit 2201a.

The identification-information determining unit 2201a determines whether identification information included in a print condition for each print job of the print-job information list managed by the print-job information managing unit 905 is information for identifying the apparatus. Specifically, the identification information included in the print condition for each print job of the print-job information list and the information for identifying the apparatus stored in the buffer are compared, thereby determining whether the identification information coincides with the information for identifying the apparatus.

When the identification information included in the print condition for each print job of the print-job information list is information for identifying the apparatus, the job-execution determining unit 2201 specifies a print job including the identification information, and requests the transmission of a request for the print job to the print-server communication I/F 901.

In this manner, the client PC 103 causes the identification information (IP address) of the print job to be included in the print condition, thereby allowing printing from the image forming apparatus 2200 at a predetermined place. With this, for example, the user can obtain a recording medium print-output from the image forming apparatus 2200 near the user.

Also, the determining unit 1601a determines whether the function indicated by the spec information stored in the spec-information managing unit 1602 satisfies the function indicated by the requested-function information included in the print condition for each print job of the print-job information list.

As explained above, according to the fourth embodiment, the print-job information list including the identification information for identifying the image forming apparatus that processes each print job is published by the print server, and it is determined by the image forming apparatus, whether the identification information specifies the apparatus for transmission of a request for a print job. Therefore, a print process can be performed only at the image forming apparatus as desired by the user. With this, user convenience for use is increased.

Figure 20:
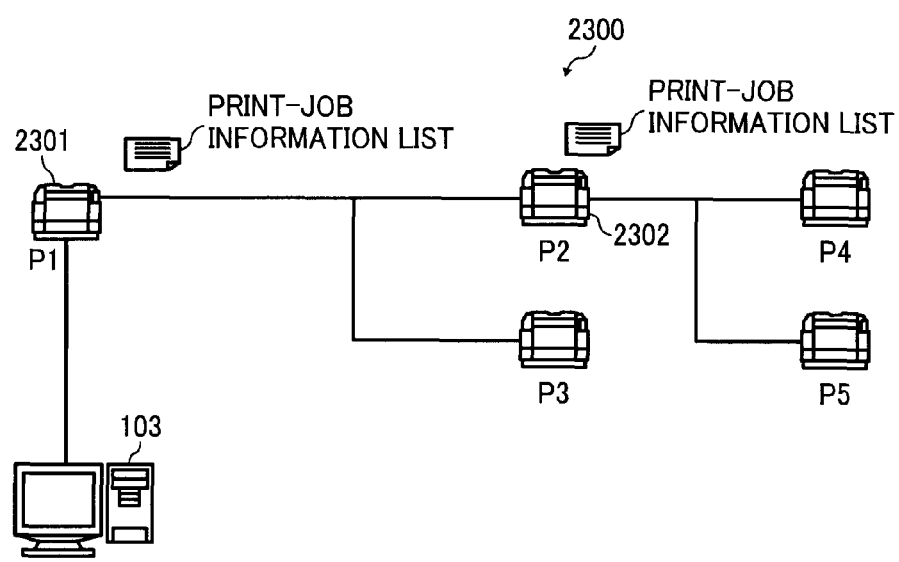
FIG. 20 is a schematic diagram of a network print system according to a fifth embodiment of the present invention.

A fifth embodiment of the present invention is explained. According to the fifth embodiment, a print server function is added to the printing apparatus. With this, a print server does not have to be provided separately, and printing apparatuses of a plurality of image forming apparatuses and others can be connected. FIG. 20 is a schematic diagram of a network print system 2300 according to the fifth embodiment.

Figure 21:
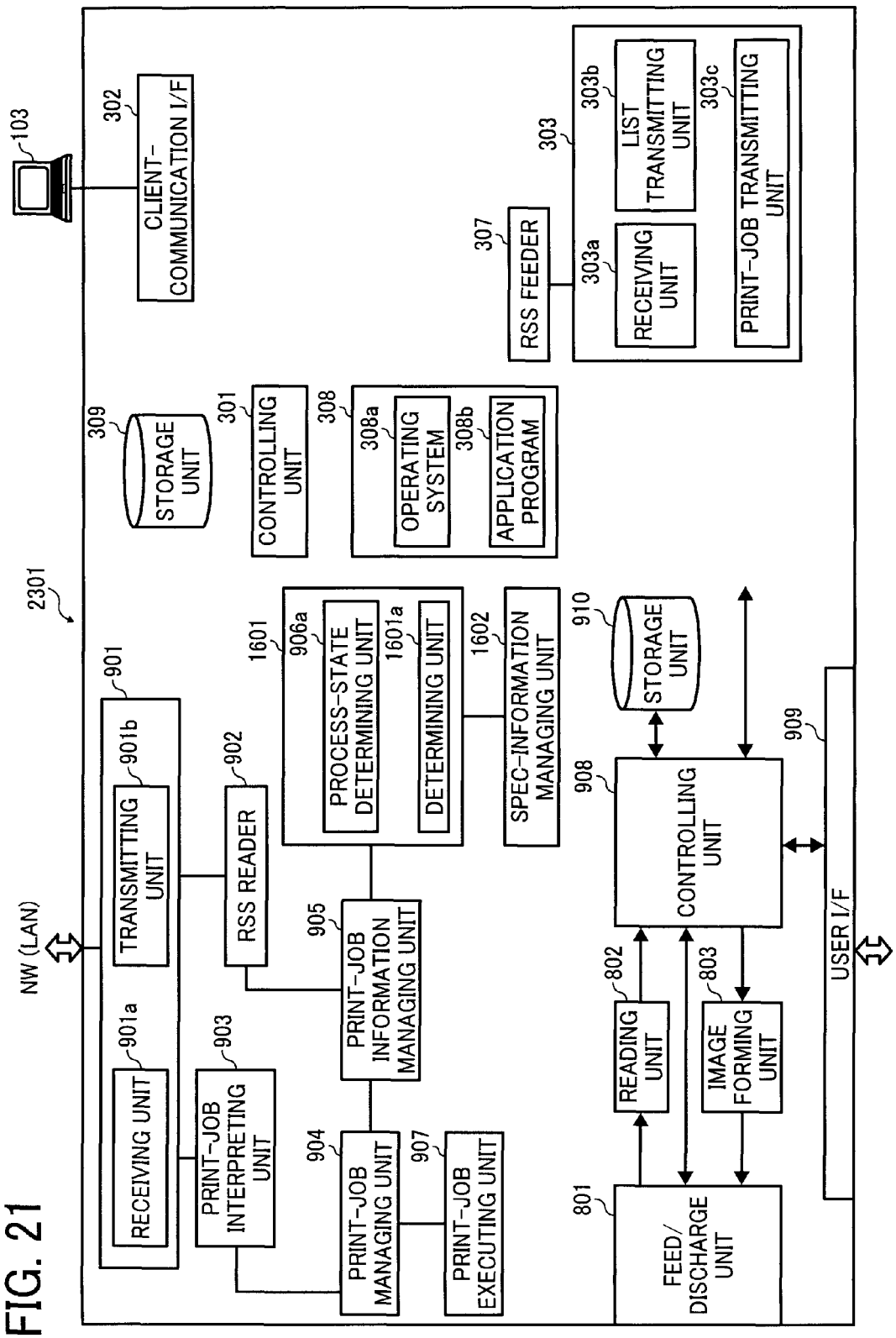
FIG. 21 is a block diagram of an image forming apparatus shown in FIG. 20.

FIG. 21 is a block diagram of an image forming apparatus 2301 according to the fifth embodiment. The image forming apparatus 2301 (P1) has the configuration and function of any of the image forming apparatuses in the first to fourth embodiments and also the configuration and function equivalent to the print server already explained above.

The image forming apparatus 2301 is achieved by, for example, boards and storage devices achieving the function of the print server 102 according to the first embodiment, and these boards and storage devices are integrally mounted on the image forming apparatus 2301.

Specifically, the image forming apparatus 2301 includes an image-forming-apparatus function unit responsible for a function as an image forming apparatus and a print-server function unit responsible for a function as a print server.

The image-forming-apparatus function unit includes the feed/discharge unit 801, the reading unit 802, the image forming unit 803, the print-server communication I/F 901, the RSS reader 902, the print-job interpreting unit 903, the print-job managing unit 904, the print-job information managing unit 905, the print-job executing unit 907, the controlling unit 908, the user I/F 909, the storage unit 910, the job-execution determining unit 1601, and the spec-information managing unit 1602.

According to the fifth embodiment, the print-job interpreting unit 903 is assumed to have the function of the print-job interpreting unit 304 included in the print server 102. Also, the print-job managing unit 904 is assumed to have the function of the print-job managing unit 306 included in the print server 102. The print-job information managing unit 905 is assumed to have the function of the print-job information managing unit 305.

On the other hand, the print-server function unit includes the controlling unit 301, the client-communication I/F 302, the image-forming-apparatus communication I/F 303, the print-job information managing unit 305, the RSS feeder 307, the program storage unit 308, and the storage unit 309.

The print-server function unit is connected to each unit of the image forming apparatus 2301 via a predetermined interface, whereby the print-server function of the image forming apparatus 2301 is expanded.

In the system shown in FIG. 20, a plurality (P2 and P3) of image forming apparatuses (printing apparatuses) having a communication function equivalent to the communication function in the embodiments explained above are connected to the image forming apparatus (P1) on a downstream side. Also for the image forming apparatus (for example, P2) 2302 on the downstream side of P1, an apparatus having the configuration and function of the print server 102 is used. On a downstream side of this image forming apparatus (P2), image forming apparatuses (printing apparatuses) P4 and P5 are further connected.

For example, when the print job can be executed with the image forming apparatus as a printing apparatus due to the print server function, the image forming apparatus (P1) 2301 deletes the print job to be executed by itself from the print-job information list published with the apparatus as a print server, then updates and publish the list, and then starts the execution of the print job of the apparatus itself (steps S2501 to S2510). In the fifth embodiment, the image forming apparatus (P2) 2302 similarly behaves as the print server 102, publishing the print-job information list based on the transmitted print job.

In the network print system 2300, an ordinary image forming apparatus (printing apparatus) having a communication function equivalent to that in the embodiments explained above is connected to a downstream side of the image forming apparatus (P2) 2302. Other than such a connection, an image forming apparatus equivalent to the image forming apparatuses (P1 and P2) (2301 and 2302) can be connected to the downstream side of P2 (normally, with a (group of) printing apparatus(es) on a further downstream side).

FIG. 22 is a sequence diagram of a print service procedure performed by the image forming apparatus 2301. First, as with steps S601 and S602 in FIG. 6, a print job is received from the print server (steps S2501 and S2502).

Next, as with steps S1202 and S1203 shown in FIG. 12, reading of the print-job information list in RSS format from the print server is suspended (steps S2503 and S2504).

Upon suspension of obtainment of the print-job information list in RSS format, as with steps S1214 and S1215 of FIG.

12 in the first embodiment, execution of the print job is requested to the print-job executing unit 907, and then the print job is executed (steps S2505 and S2506).

Next, as with steps S604 to S608 of FIG. 6 in the first embodiment, the print-job information list in RSS format is published (steps S2507 to S2511).

As explained above, according to the fifth embodiment, the function of the print server is added to the image forming apparatus, which achieves effects similar to those achieved by the embodiments explained above.

In all of the exemplary systems explained so far, the apparatuses are separately connected in a tree shape via the shown network. Alternatively, all devices can be connected with a single network. In the explanation above, for example, a representation of "the downstream side" is merely conceptual, and an equivalent connection is achieved on the network. In practice, the printing apparatus performs RSS read of the print-job list information in a time-division manner with respect to the print servers whose addresses are registered.

A computer program can be executed to implement the job management method, i.e., a method of controlling the apparatuses to perform a desired process related to a print service in the network print system as explained above. That is, in the job management method, the print server generates a print-job information list in RSS format based on a print job received from the client PC, and publishes it. The print server receives a request for transferring a print job from an image forming apparatus through a network, and transmits the print job to the image forming apparatus from the print-job information list. Also, a computer program can be executed to causes the image forming apparatus to spontaneously obtain and read the print-job information list in RSS format from the print server on the network, and request the print server to transmit a print job.

The network print system (see FIG. 1) includes an MFP as a printing apparatus. However, the printing apparatus is not necessarily an MFP, and can be any apparatus being connected to the network, as long as the apparatus includes at least a print function and a communication function equivalent to that explained above. Even when apparatuses with various print schemes and print performances are connected, use efficiency can be increased as a print server system, resulting in high system expandability. Thus, management can be significantly facilitated.

As set forth hereinabove, according to an embodiment of the present invention, information registration and management of other output devices are not necessary at a job management apparatus or output device side, and jobs can be efficiently processed by a plurality of output devices.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:
1. A job management system comprising:
plural output devices, each of the plural output devices being configured to perform an output job; and
a job management apparatus that transmits jobs to the plural output devices without having to register device information about each of the plural output devices, wherein the job management apparatus includes
a job managing unit that stores therein one or more jobs requested by client terminals and to be performed;
a job-information managing unit that creates a job-information list including job identification data identifying the one or more jobs stored in the job managing unit and to be performed;
a feeder that converts the job-information list to public data in an RSS format to be transmitted to the plural output devices, and stores the public data, the public data including the job identification data identifying the one or more jobs to be performed;
a first receiving unit that receives, from one of the plural output devices, a transmission request for a specific job in the job-information list; and
a first transmitting unit that transmits, in response to the transmission request, the specific job from the job managing unit to the plural output devices, and
each output device of the plural output devices includes
a reader that receives the public data from the job management apparatus, and creates the job-information list based on the public data;
a specifying unit that determines whether the job identification data identifying the one or more jobs to be performed is included in the job-information list, and in a case that the job identification data is included in the job-information list, specifies a job to be retrieved from the job management apparatus, from the one or more jobs identified by the job identification data;
a second transmitting unit that transmits a transmission request for the job specified by the specifying unit to the job management apparatus; and
a second receiving unit that receives the specified job from the job managing unit of the job management apparatus.

2. The job management system according to claim 1, wherein
each output device of the plural output devices further includes a determining unit that determines whether a job is being performed, and
the specifying unit of the output device specifies a job to perform next when there is no job being performed.

3. The job management system according to claim 1, wherein
the job managing unit stores therein first information on function required to perform each of the jobs, along with the jobs, and the job-information list includes the first information, and wherein
each output device of the plural output devices further includes
an information managing unit that stores therein second information on function of the output device; and
a determining unit that compares the second information with the first information in the job-information list to determine whether the function of the output device satisfies the function required to perform each of the jobs, wherein
the specifying unit of the output unit specifies a job when the determining unit determines that the function of the output device satisfies function required to perform the job.

4. The job management system according to claim 1, wherein
the job managing unit stores therein, for each stored job, identification information for identifying one or more output devices corresponding to the stored job, and the job-information list includes the identification information with respect to each of the stored jobs, and wherein
each output device of the plural output devices further includes a determining unit that determines whether the identification information in the job-information list identifies the output device, and the specifying unit of the output unit specifies a job when the determining unit determines that the identification information corresponding to the job identifies the output device.

5. The job management system according to claim 1, wherein the specifying unit specifies a job to perform from the job-information list based on a job-processing speed of the output device and a volume of each of the jobs.

6. The job management system according to claim 1, wherein
the job management apparatus further includes a list transmitting unit that publishes the public data representing the job-information list in the RSS format to the plural output devices, upon request of the feeder.

7. The job management system according to claim 1, wherein the public data representing the job-information list in the RSS format is transmitted to the reader, the specifying unit, the second transmitting unit and the second receiving unit, upon request of the feeder.

8. The job management system according to claim 1, wherein
the feeder of the job management apparatus stores the public data, including the job identification data identifying the one or more jobs to be printed, in a buffer, and
the reader of said each output device periodically submits a public data request to the job management apparatus to check whether the buffer contains the one or more jobs to be performed.

9. A job management method applied to a job management system including plural output devices each being configured to perform an output job, and a job management apparatus that transmits jobs to the plural output devices without having to register device information about each of the plural output devices, the job management method comprising:
in the job management apparatus,
(a) storing one or more jobs requested by client terminals and to be performed;
(b) creating a job-information list including job identification data identifying the one or more jobs stored in (a) and to be performed;
(c) converting, by a feeder of the job management apparatus, the job-information list created in (b), to public data in an RSS format to be transmitted to the plural output devices, and storing the public data, the public data including the job identification data identifying the one or more jobs to be performed;
(d) receiving, from one of the plural output devices, a transmission request for a specific job in the job-information list; and
(e) transmitting, in response to the transmission request received in (d), the specific job to the output devices, and
in each output device of the plural output devices,
(aa) receiving, by a reader of the output device, the public data from the job management apparatus and creating the job-information list based on the public data;
(bb) determining whether the job identification data identifying the one or more print jobs to be performed is included in the job-information list;
(cc) specifying a job to be retrieved from the job management apparatus, from the one or more jobs identified by the job identification data included in the job-information list created in (aa);
(dd) transmitting a transmission request for the job specified in (cc) to the job management apparatus; and
(ee) receiving the specified job specified in (cc) from the job management apparatus.

10. The job management method according to claim 9, further comprising, in each output device of the plural output devices,
(ee) determining whether a job is being performed; and
(ff) specifying a job to perform next when it is determined in (ee) that there is no job being performed.

11. The job management method according to claim 9, further comprising:
in the job management apparatus,
storing first information on function required to perform each of the jobs, along with the jobs, wherein
the job-information list created in (b) includes the first information; and
in each output device of the plural output devices,
storing second information on function of the output device; and
determining, by comparing the second information with the first information in the job-information list, whether the function of the output device satisfies the function required to perform each of the jobs; and
specifying a job when the function of the output device is determined to satisfy function required to perform the job.

12. The job management method according to claim 9, further comprising:
in the job management apparatus,
storing, for each stored job, identification information for identifying one or more output devices corresponding to the stored job, wherein
the job-information list created in (b) includes the identification information with respect to each of the jobs; and
in the output device,
determining whether the identification information in the job-information list identifies the output device, and
specifying a job when the identification information corresponding to the job is determined to identify the output device.

13. The job management method according to claim 9, wherein the plural output devices includes
a reader that receives the public data from the job management apparatus, and creates the job-information list based on the public data,
a specifying unit that determines whether the job identification data identifying the one or more jobs to be performed is included in the job-information list, and in a case that the job identification data is included in the job-information list, specifies a job to be retrieved from the job management apparatus, from the one or more jobs identified by the job identification data,
a second transmitting unit that transmits a transmission request for the job specified by the specifying unit to the job management apparatus, and
a second receiving unit that receives the specified job from the job management apparatus, and
wherein the job management method further comprises
transmitting the public data representing the job-information list in the RSS format to the reader, the specifying unit, the second transmitting unit and the second receiving unit, after (c).

* * * * *